US012673287B2

(12) United States Patent
Sanocki et al.

(10) Patent No.: US 12,673,287 B2
(45) Date of Patent: Jul. 7, 2026

(54) FILTER FRAME ASSEMBLY FOR FILTER MEDIA, FILTRATION SYSTEM, AND METHOD OF USE THEREOF

(71) Applicant: 3M INNOVATIVE PROPERTIES COMPANY, St. Paul, MN (US)

(72) Inventors: Mark A. Sanocki, Vadnais Heights, MN (US); Glen O. Gregerson, Hudson, WI (US); Riley J. Hillstrom, Hudson, WI (US); Michael L. Munson, Maple Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 508 days.

(21) Appl. No.: 18/178,093

(22) Filed: Mar. 3, 2023

(65) Prior Publication Data

US 2023/0277970 A1    Sep. 7, 2023

Related U.S. Application Data

(60) Provisional application No. 63/316,462, filed on Mar. 4, 2022.

(51) Int. Cl.
B01D 46/00      (2022.01)
F24F 13/28      (2006.01)

(52) U.S. Cl.
CPC ..... B01D 46/0005 (2013.01); B01D 46/0041 (2013.01); B01D 46/0054 (2013.01); B01D 2279/50 (2013.01); F24F 13/28 (2013.01)

(58) Field of Classification Search
CPC ............ B01D 46/0005; B01D 46/0041; B01D 46/0054; B01D 2279/50; B01D 46/18; F24F 13/28

USPC ................................................ 55/385.1, 351
See application file for complete search history.

(56) References Cited

U.S. PATENT DOCUMENTS

| | | | |
|---|---|---|---|
| 1,868,883 A | 7/1932 | Campbell |
| 2,016,991 A | 10/1935 | Dollinger |
| 2,499,412 A | 3/1950 | Lynn |
| 2,557,440 A | 6/1951 | Komline |
| 2,602,549 A | 7/1952 | Lynn |

(Continued)

FOREIGN PATENT DOCUMENTS

| | | | |
|---|---|---|---|
| CN | 204193604 U | 3/2015 |
| DE | 2852214 A1 | 5/1980 |

(Continued)

*Primary Examiner* — T. Bennett McKenzie
(74) *Attorney, Agent, or Firm* — Ann K. Gallagher

(57) ABSTRACT

A filter frame assembly includes a main frame including a first end and a second end, and a spindle unit disposed at the first end. The spindle unit includes a spindle frame, a dispensing spindle non-rotatably coupled to the spindle frame, and a receiving spindle rotatably coupled to the spindle frame. Each of the dispensing spindle and the receiving spindle is configured to receive a filter web thereon in a wound configuration. The main frame is insertable through a filter slot of an HVAC system from the second end, such that the main frame is at least partially received within the HVAC system and the spindle unit is disposed external to the HVAC system. The filter web extends from the dispensing spindle towards the second end of the main frame and extends back to the receiving spindle, while being at least partially received in the main frame.

18 Claims, 22 Drawing Sheets

(56)  References Cited

U.S. PATENT DOCUMENTS

| | | | |
|---|---|---|---|
| 2,664,203 A | 12/1953 | Crane et al. | |
| 2,675,129 A | 4/1954 | Doubleday | |
| 2,752,003 A | 6/1956 | Hersey, Jr. et al. | |
| 2,851,163 A | 9/1958 | Axel | |
| 3,003,582 A | 10/1961 | Palmore | |
| 3,007,651 A | 11/1961 | Palmore | |
| 3,013,630 A | 12/1961 | Palmore | |
| 3,019,855 A | 2/1962 | Engle | |
| 3,175,775 A | 3/1965 | Wurtenberg et al. | |
| 3,276,191 A | 10/1966 | Revell | |
| 3,286,443 A | 11/1966 | Wooldridge | |
| 3,296,780 A | 1/1967 | Revell | |
| 3,317,052 A | 5/1967 | Davis | |
| 3,332,215 A | 7/1967 | Revell | |
| 3,348,366 A | 10/1967 | Bennett | |
| 3,359,709 A | 12/1967 | Revell | |
| 3,364,662 A | 1/1968 | Revell | |
| 3,372,811 A | 3/1968 | Arnold et al. | |
| 3,408,795 A | 11/1968 | Revell et al. | |
| 3,421,297 A | 1/1969 | Dahlem | |
| 3,467,797 A | 9/1969 | Revell | |
| 3,506,128 A | 4/1970 | Pashaian et al. | |
| 3,552,101 A | 1/1971 | Papp | |
| 3,598,244 A | 8/1971 | Babcock, Jr. | |
| 3,667,614 A | 6/1972 | Komline | |
| 3,836,006 A | 9/1974 | Davis | |
| 3,901,809 A | 8/1975 | Ball et al. | |
| 3,985,528 A | 10/1976 | Revell | |
| 4,011,067 A | 3/1977 | Carey, Jr. | |
| 4,233,157 A | 11/1980 | Miller | |
| 4,686,042 A | 8/1987 | Eckardt | |
| 4,711,649 A | 12/1987 | Berryhill | |
| 4,826,596 A | 5/1989 | Hirs | |
| 4,869,834 A | 9/1989 | Hudson | |
| 4,911,842 A | 3/1990 | Hoffmann | |
| 4,919,825 A | 4/1990 | Croket | |
| 5,112,485 A | 5/1992 | Hirs | |
| 5,122,270 A | 6/1992 | Ruger et al. | |
| 5,417,850 A | 5/1995 | Schimion et al. | |
| 5,435,870 A | 7/1995 | Takagaki et al. | |
| 5,565,112 A | 10/1996 | Bratten | |
| 6,089,379 A | 7/2000 | Hindi | |
| 6,197,077 B1* | 3/2001 | Simmons | B01D 46/10 55/491 |
| 6,267,832 B1 | 7/2001 | Choi | |
| 6,402,822 B1 | 6/2002 | Najm | |
| 6,550,622 B2 | 4/2003 | Koslow | |
| 6,596,059 B1 | 7/2003 | Greist et al. | |
| 6,632,269 B1* | 10/2003 | Najm | B01D 46/20 55/501 |
| 6,800,197 B1 | 10/2004 | Kosola et al. | |
| 6,814,660 B1* | 11/2004 | Cavett | B01D 46/10 454/284 |
| 6,860,917 B2 | 3/2005 | Henrichsen et al. | |
| 6,926,781 B2 | 8/2005 | Duffy | |
| 7,255,300 B2 | 8/2007 | Johnston | |
| 7,481,917 B2 | 1/2009 | Ikeyama et al. | |
| 7,858,163 B2 | 12/2010 | Angadjivand et al. | |
| 7,909,954 B2 | 3/2011 | Johnston et al. | |
| 7,947,142 B2 | 5/2011 | Fox et al. | |
| 8,162,153 B2 | 4/2012 | Fox et al. | |
| 8,292,980 B2 | 10/2012 | Yamagishi et al. | |
| 8,366,276 B2 | 2/2013 | Yamamoto | |
| 8,506,807 B2 | 8/2013 | Lee et al. | |
| 8,668,828 B2 | 3/2014 | Knappe et al. | |
| 8,784,662 B2 | 7/2014 | Becker et al. | |
| 8,944,428 B2 | 2/2015 | Piening et al. | |
| 9,675,915 B1 | 6/2017 | Warden et al. | |
| 9,700,825 B2 | 7/2017 | Greenwood et al. | |
| 10,363,509 B2 | 7/2019 | Arthur et al. | |
| 10,399,039 B2 | 9/2019 | Steen | |
| 10,662,834 B2 | 5/2020 | Jokschas et al. | |
| 10,888,811 B2 | 1/2021 | Hong et al. | |
| 2004/0129139 A1* | 7/2004 | Schumacher | B60H 3/06 55/354 |

| | | | |
|---|---|---|---|
| 2005/0178734 A1 | 8/2005 | Kilmer et al. | |
| 2010/0077926 A1* | 4/2010 | Yamagishi | B03C 3/64 96/423 |
| 2010/0170211 A1 | 7/2010 | Vaillant et al. | |
| 2011/0197555 A1 | 8/2011 | Schildermans et al. | |
| 2012/0298570 A1 | 11/2012 | Osawa et al. | |
| 2019/0351358 A1 | 11/2019 | Cynn | |
| 2020/0016959 A1 | 1/2020 | Stahl et al. | |
| 2020/0139303 A1 | 5/2020 | Dupont | |
| 2020/0331771 A1 | 10/2020 | Choi et al. | |
| 2021/0121808 A1 | 4/2021 | Kim et al. | |

FOREIGN PATENT DOCUMENTS

| | | | |
|---|---|---|---|
| DE | 3641658 A1 | 6/1988 | |
| DE | 4227775 C2 | 11/2001 | |
| GB | 594953 A | 11/1947 | |
| GB | 796942 A | 6/1958 | |
| GB | 865824 A | 4/1961 | |
| GB | 1265319 A | 3/1972 | |
| GB | 1327963 A | 8/1973 | |
| GB | 1442988 A | 7/1976 | |
| GB | 2160437 A | 12/1985 | |
| JP | H01-104320 A | 4/1989 | |
| JP | 2516792 Y2 | 10/1992 | |
| JP | H06-114224 A | 4/1994 | |
| JP | H06-304439 A | 11/1994 | |
| JP | H07-000735 A | 1/1995 | |
| JP | H07-035363 A | 2/1995 | |
| JP | H07-035948 U | 7/1995 | |
| JP | H07-232023 A | 9/1995 | |
| JP | 2795581 B2 | 9/1998 | |
| JP | H11-006679 A | 1/1999 | |
| JP | 2000274803 A | 10/2000 | |
| JP | 2002186814 A | 7/2002 | |
| JP | 2003251128 A | 9/2003 | |
| JP | 2004057932 A | 2/2004 | |
| JP | 3571157 B2 | 9/2004 | |
| JP | 3585682 B2 | 11/2004 | |
| JP | 2006090570 A | 4/2006 | |
| JP | 4126627 B2 | 7/2008 | |
| JP | 4232530 B2 | 3/2009 | |
| JP | 4581197 B2 | 11/2010 | |
| JP | 2011104575 A | 6/2011 | |
| JP | 4876330 B2 | 2/2012 | |
| JP | 2012121015 A | 6/2012 | |
| JP | 5484528 B2 | 5/2014 | |
| JP | 2014161834 A | 9/2014 | |
| JP | 2017080367 A | 5/2017 | |
| JP | 6304439 B1 | 4/2018 | |
| KR | 19910009233 U | 11/1991 | |
| KR | 20-0208271 Y1 | 12/2000 | |
| KR | 10-0366849 B1 | 1/2003 | |
| KR | 20-0344012 Y1 | 3/2004 | |
| KR | 10-0617840 B1 | 8/2006 | |
| KR | 10-0670736 B1 | 1/2007 | |
| KR | 20070073694 A | 7/2007 | |
| KR | 10-0790481 B1 | 1/2008 | |
| KR | 20120029490 A | 3/2012 | |
| KR | 10-1174080 B1 | 8/2012 | |
| KR | 20130024200 A | 3/2013 | |
| KR | 10-1317615 B1 | 10/2013 | |
| KR | 10-1644504 B1 | 8/2016 | |
| KR | 10-1714605 B1 | 3/2017 | |
| KR | 10-1747961 B1 | 6/2017 | |
| KR | 10-1752664 B1 | 6/2017 | |
| KR | 20180031505 A | 3/2018 | |
| KR | 10-1867870 B1 | 6/2018 | |
| KR | 10-1870328 B1 | 6/2018 | |
| KR | 10-1876224 B1 | 7/2018 | |
| KR | 10-1900852 B1 | 9/2018 | |
| KR | 10-1962730 B1 | 3/2019 | |
| KR | 10-2062335 B1 | 1/2020 | |
| KR | 20200021635 A | 3/2020 | |
| KR | 10-2087845 B1 | 4/2020 | |
| KR | 20200075408 A | 6/2020 | |
| KR | 10-2150968 B1 | 9/2020 | |
| KR | 10-2186421 B1 | 12/2020 | |
| KR | 10-2186424 B1 | 12/2020 | |

(56)                    References Cited

FOREIGN PATENT DOCUMENTS

| | | | |
|---|---|---|---|
| KR | 10-2189022 | B1 | 12/2020 |
| KR | 20210050437 | A | 5/2021 |
| KR | 20210055535 | A | 5/2021 |
| WO | 1997024170 | A1 | 7/1997 |
| WO | 2008078858 | A1 | 7/2008 |
| WO | 2011094236 | A2 | 8/2011 |
| WO | 2012071026 | A1 | 5/2012 |
| WO | 2016089688 | A1 | 6/2016 |
| WO | 2017179743 | A1 | 10/2017 |
| WO | 2018004069 | A1 | 1/2018 |
| WO | 2018084701 | A1 | 5/2018 |
| WO | 2020051215 | A1 | 3/2020 |
| WO | 2020197538 | A1 | 10/2020 |

* cited by examiner

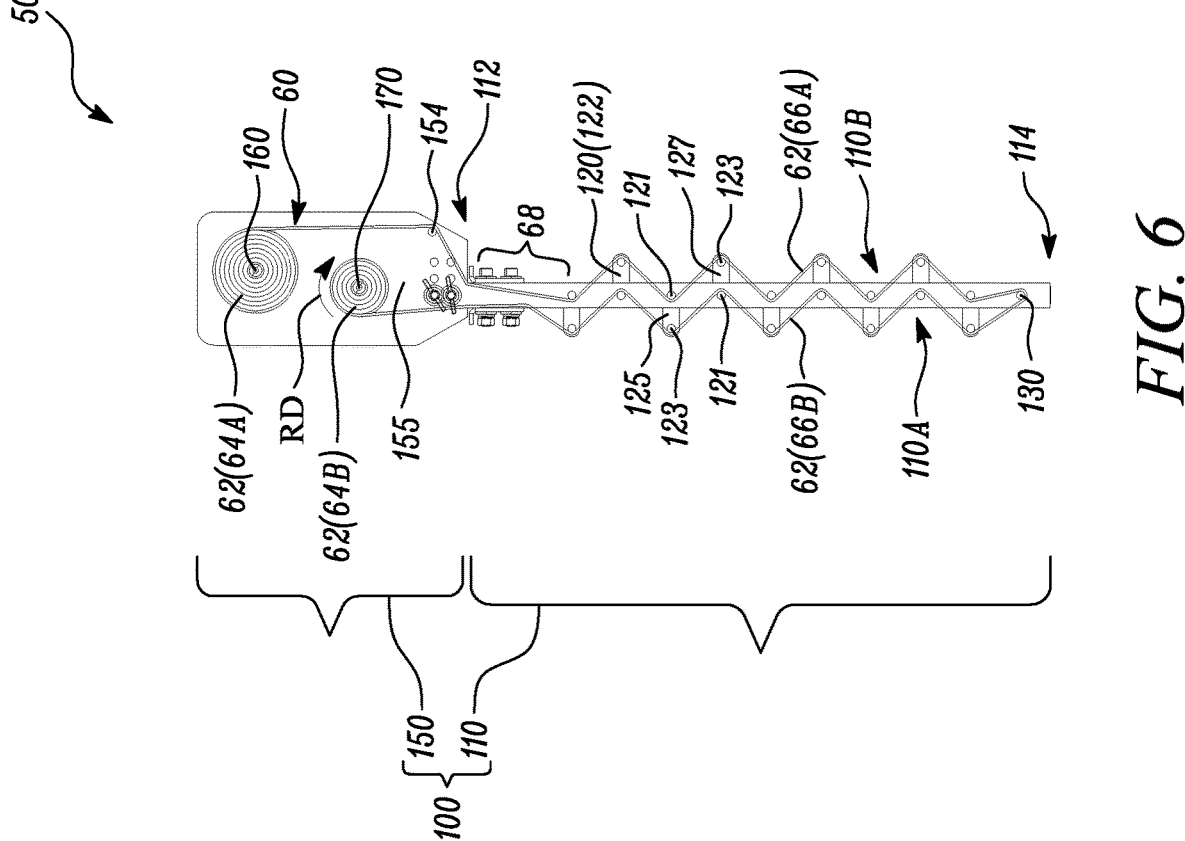
*FIG. 6*
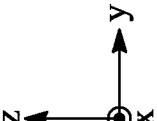

100

52

150

155

151

152

112

140

110

114

115

FILTER FRAME ASSEMBLY FOR FILTER MEDIA, FILTRATION SYSTEM, AND METHOD OF USE THEREOF

TECHNICAL FIELD

The present disclosure relates to an air filtration assembly including replaceable filter media for use with a heating, ventilation, and air conditioning (HVAC) system.

BACKGROUND

An HVAC system typically utilizes an air filter that filters air passing therethrough. Specifically, the filter may filter air to remove undesired particles and contaminants (e.g., dust, dander, dirt) from proceeding through ducts to an internal environment that is to be heated, cooled, or otherwise conditioned by the HVAC system. Typically, in an HVAC system, an air filter is located next to the furnace or air conditioning system air handler (which typically contains a fan and fan motor). The air handler typically pulls air from the house or building through a "return" duct system and then blows the air through the heating or cooling system and back into the house or building through the duct system. The filter is typically, but not exclusively, located at the point where the return duct enters the air handler.

However, the filter may become ineffective or blocked by the particles and/or contaminants over time. The buildup and subsequent blockage of the filter by the particles and/or contaminants may cause an increase in pressure drop and reduced air flow through the filter, thereby causing undue stress to the HVAC system and loss in efficiency of the HVAC system. As a result, the filter may need to be replaced in order to maintain adequate air quality and airflow of the air drawn therethrough. A filter that is ineffective or blocked may cause wear to fan or blower motors of the HVAC system.

Conventionally, the filter may need to be replaced at short intervals (e.g., every one to three months). As a result, a user may forget to timely replace the filter at the short intervals. This may cause loss of system efficiency, and unnecessary wear to the fan or blower motors of the HVAC system. Furthermore, accessing the HVAC system and replacing the filter periodically at such short intervals may be cumbersome and inconvenient for the user.

SUMMARY

In a first aspect, the present disclosure provides a filter frame assembly for use with filter media comprising a filter web. The filter frame assembly includes a main frame. The main frame includes a first end, a second end opposing the first end, and a longitudinal axis extending from the first end to the second end. The filter frame assembly further includes a spindle unit disposed at the first end of the main frame. The spindle unit includes a spindle frame coupled to the main frame and extending from the first end of the main frame. The spindle unit further includes a dispensing spindle non-rotatably coupled to the spindle frame. The spindle unit further includes a receiving spindle spaced apart from the dispensing spindle and rotatably coupled to the spindle frame. The main frame is at least partially insertable through a filter slot (or a receiving bay) of an HVAC system from the second end, such that the main frame is at least partially received within the HVAC system and the spindle unit is disposed external to the HVAC system. Each of the dispensing spindle and the receiving spindle is configured to at least partially receive the filter web of the filter media thereon in a wound configuration, such that the filter web extends from the dispensing spindle towards the second end of the main frame and extends back to the receiving spindle, while being at least partially received in the main frame.

In a second aspect, the present disclosure provides a filtration system for an HVAC system having a filter slot. The filtration system includes filter media comprising a filter web and a filter frame assembly supporting the filter web. The filter frame assembly includes a main frame including a first end, a second end opposing the first end, and a longitudinal axis extending from the first end to the second end. The filter frame assembly further includes a spindle unit disposed at the first end of the main frame. The spindle unit includes a spindle frame coupled to the main frame and extending from the first end of the main frame. The spindle unit further includes a dispensing spindle non-rotatably coupled to the spindle frame. The dispensing spindle at least partially receives the filter web thereon in a first wound configuration. The spindle unit further includes a receiving spindle spaced apart from the dispensing spindle and rotatably coupled to the spindle frame. The receiving spindle at least partially receives the filter web thereon in a second wound configuration. The main frame is at least partially insertable through the filter slot of the HVAC system from the second end, such that the main frame is at least partially received within the HVAC system and the spindle unit is disposed external to the HVAC system. The filter web extends from the first wound configuration on the dispensing spindle towards the second end of the main frame and extends back to the second wound configuration on the receiving spindle, while being at least partially received in the main frame.

In a third aspect, the present disclosure provides a method of using the filtration system of the second aspect. The method includes at least partially inserting the main frame through the filter slot (or a receiving bay) of the HVAC system from the second end, such that the main frame is at least partially received within the HVAC system and the spindle unit is disposed external to the HVAC system.

In a fourth aspect, the present disclosure provides a heating, ventilation, and air conditioning (HVAC) system. The HVAC system includes a filter slot having a slot width. The HVAC system further includes the filtration system of the second aspect. A maximum frame thickness of the main frame is less than or equal to the slot width of the filter slot. The main frame is at least partially and removably received within the HVAC system through the filter slot, such that the spindle unit is disposed external to the HVAC system.

In a fifth aspect, the present disclosure provides a heating, ventilation, and air conditioning (HVAC) system that includes a filter slot having a slot width. The HVAC system further includes the filtration system of the second aspect. The main frame of the filtration system further includes a plurality of louvers movably coupled to the main frame and spaced apart from each other along the longitudinal axis. Each louver from the plurality of louvers is movable relative to the main frame between an expanded position and a contracted position. In the expanded position, each louver extends outwardly from the main frame and is inclined relative to the longitudinal axis by a first angle. In the contracted position, each louver is inclined relative to the longitudinal axis by a second angle that is less than the first angle. Each louver is biased towards the expanded position and at least partially receives the filter web thereon. A maximum frame thickness of the main frame is less than or equal to the slot width of the filter slot. In the respective expanded positions, a total width defined by adjacent lou-vers perpendicular to the longitudinal axis is greater than the slot width of the filter slot. The main frame is at least partially and removably received within the HVAC system through the filter slot, such that the spindle unit is disposed external to the HVAC system. During insertion of the plurality of louvers through the filter slot, the plurality of louvers sequentially move from the respective expanded positions to the respective contracted positions due to engagement with a wall of the filter slot. After insertion of the plurality of louvers through the filter slot, each louver moves back to the expanded position.

In a sixth aspect, the present disclosure provides a spindle for use with filter media including a filter web. The spindle includes a main tubular portion including a first tubular end and a second tubular end opposite to the first tubular end. The main tubular portion is configured to at least partially receive the filter web thereon in a wound configuration. The spindle further includes a gear portion fixedly coupled to the main tubular portion and disposed at the first tubular end of the main tubular portion. The gear portion comprises a plurality of teeth. The spindle further includes a first cou-pling portion extending from the gear portion opposite to the main tubular portion. The first coupling portion is configured to be coupled to a spindle frame. The spindle further includes a second coupling portion fixedly coupled to the main tubular portion and disposed at the second tubular end of the main tubular portion. The second coupling portion is configured to be coupled to the spindle frame.

In a seventh aspect, the present disclosure provides a filter roll. The filter roll includes the spindle of the sixth aspect. The filter roll further includes filter media including a filter web. The filter web is at least partially wound on the main tubular portion of the spindle.

The details of one or more examples of the disclosure are set forth in the accompanying drawings and the description below. Other features, objects, and advantages of the dis-closure will be apparent from the description and drawings, and from the claims.

BRIEF DESCRIPTION OF THE DRAWINGS

Exemplary embodiments disclosed herein may be more completely understood in consideration of the following detailed description in connection with the following fig-ures. The figures are not necessarily drawn to scale. Like numerals used in the figures refer to like components. However, it will be understood that the use of a numeral to refer to a component in a given figure is not intended to limit the component in another figure labeled with the same number.

FIG. 6 illustrates a schematic side view of the filtration system according to an embodiment of the present disclo-sure;

DETAILED DESCRIPTION

Figure 1A:
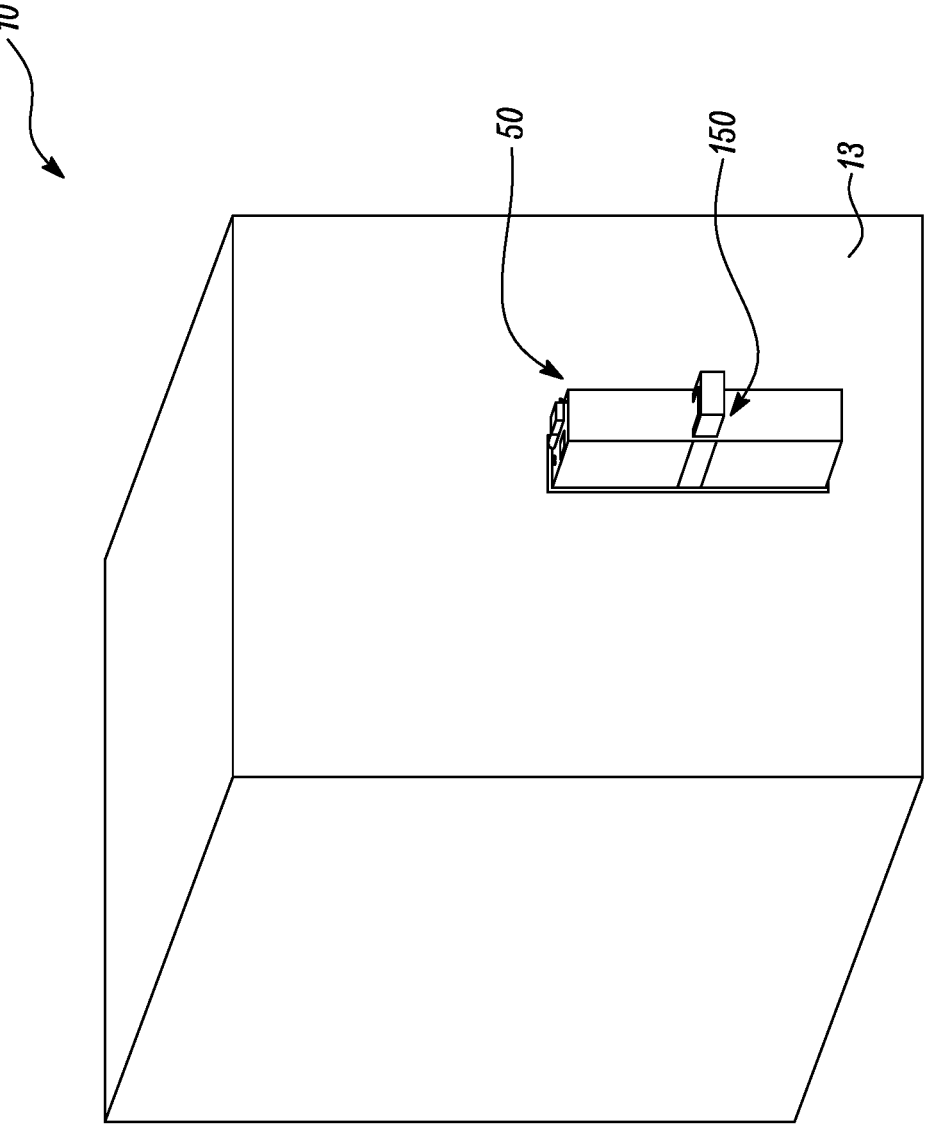
FIG. 1A illustrates a schematic perspective view of an HVAC system according to an embodiment of the present disclosure.

In the following description, reference is made to the accompanying figures that form a part thereof, and in which various embodiments are shown by way of illustration. It is to be understood that other embodiments are contemplated and may be made without departing from the scope or spirit of the present disclosure. The following detailed description, therefore, is not to be taken in a limiting sense.

In the present disclosure, the following definitions are adopted.

As recited herein, all numbers should be considered modified by the term "about". As used herein, "a," "an," "the," "at least one," and "one or more" are used inter-changeably.

As used herein as a modifier to a property or attribute, the term "generally," unless otherwise specifically defined, means that the property or attribute would be readily rec-ognizable by a person of ordinary skill but without requiring absolute precision or a perfect match (e.g., within +/−20% for quantifiable properties).

The term "substantially," unless otherwise specifically defined, means to a high degree of approximation (e.g., within +/−10% for quantifiable properties) but again without requiring absolute precision or a perfect match.

The term "about," unless otherwise specifically defined, means to a high degree of approximation (e.g., within +/−5% for quantifiable properties) but again without requiring absolute precision or a perfect match.

Terms such as same, equal, uniform, constant, strictly, and the like, are understood to be within the usual tolerances or measuring error applicable to the particular circumstance rather than requiring absolute precision or a perfect match.

As used herein, when a first material is termed as "similar" to a second material, at least 90 weight % of the first and second materials are identical and any variation between the first and second materials comprises less than about 10 weight % of each of the first and second materials.

As used herein, the term "controller" generally refers to a device that can be programmed to control a device or system. Controllers may include one or more microprocessors, digital signal processors (DSPs), application specific integrated circuits (ASICs), field programmable gate arrays (FPGAs), or any other equivalent integrated or discrete logic circuitry, as well as any combinations of such components.

As used herein, "at least one of A and B" should be understood to mean "only A, only B, or both A and B".

The present disclosure relates to a filter frame assembly for use with filter media including a filter web. The filter frame assembly includes a main frame. The main frame includes a first end, a second end opposing the first end, and a longitudinal axis extending from the first end to the second end. The filter frame assembly further includes a spindle unit disposed at the first end of the main frame. The spindle unit includes a spindle frame coupled to the main frame and extending from the first end of the main frame. The spindle unit further includes a dispensing spindle non-rotatably coupled to the spindle frame. The spindle unit further includes a receiving spindle spaced apart from the dispensing spindle and rotatably coupled to the spindle frame. The main frame is at least partially insertable through a filter slot of an HVAC system from the second end, such that the main frame is at least partially received within the HVAC system and the spindle unit is disposed external to the HVAC system. Each of the dispensing spindle and the receiving spindle is configured to at least partially receive the filter web of the filter media thereon in a wound configuration, such that the filter web extends from the dispensing spindle towards the second end of the main frame and extends back to the receiving spindle, while being at least partially received in the main frame.

The filter frame assembly of the present disclosure may filter air that is drawn therethrough. When the main frame is at least partially received within the HVAC system through the filter slot from the second end, the filter web that is at least partially received in the main frame may filter air that is drawn therethrough, thereby preventing undesired particles from proceeding through ducts to the internal environment that is to be heated, cooled, or otherwise conditioned by the HVAC system. Specifically, a main frame web portion of the filter web may filter air that is drawn therethrough by the HVAC system. As a result, the main frame web portion of the filter web may become ineffective or blocked over time by dust and contaminants.

The filter web that is wound on the dispensing spindle may be fresh filter web (i.e., new and unused filter media). As the receiving spindle rotates, the fresh filter web may be dispensed from the dispensing spindle and received at least partially in the main frame. Further, as the receiving spindle rotates, the main frame web portion of the filter web (which may be blocked by contaminants) may be collected from the main frame onto the receiving spindle. Therefore, the receiving spindle may be rotated to circulate the fresh filter web from the dispensing spindle to the main frame, and simultaneously receive the contaminated main frame web portion of the filter web thereon.

The filter frame assembly may be used to circulate the filter web in order to maintain a low pressure drop through the filter web and provide clean air for a long duration (e.g., 1 year or more), as compared to conventional filters that need to be manually replaced at short time intervals (e.g., monthly).

Further, as each of the dispensing spindle and the receiving spindle is disposed at the first end of the main frame, the filter frame assembly may be used with HVAC systems with a filter slot having a single opening.

In some examples, the filter frame assembly may include a plurality of louvers movably coupled to the main frame. The plurality of louvers may expand a capacity of a filter slot (e.g., from 1 inch to 4 inches), thereby increasing surface area resulting in a reduction of pressure drop across the filter web. The plurality of louvers may therefore allow the filter frame assembly to be used with conventional filter slots and improve their capacities.

Referring now to the Figures, FIG. 1A illustrates a schematic perspective view of a heating, ventilation, and air conditioning (HVAC) system 10 according to an embodiment of the present disclosure.

The HVAC system 10 may include a broad range of equipment that is intended to be used in treatment of internal environments, including chiller units, heat pumps, forced air heat systems, radiant heating systems, geothermal heating systems, steam radiators, geothermal cooling systems, solar heating systems, evaporative coolers, airflow dampers, active or passive ventilation systems, and humidity control systems, among others. The HVAC system 10 is schematically illustrated as a cuboid in FIG. 1A. Specific details of the HVAC system 10 are not shown in FIG. 1A for illustrative purposes.

The HVAC system 10 may be operated by a control unit (not shown). The control unit may monitor one or more environmental parameters (such as temperature, humidity level, etc.) of an internal environment, and operate the HVAC system 10 to maintain the internal environment within desired parameters.

The HVAC system 10 further includes a filtration system 50. The filtration system 50 may be at least partially received within the HVAC system 10, typically a filter slot or other receiving bay. Further, the filtration system 50 may be at least partially disposed external to the HVAC system 10. In other words, at least a portion of the filtration system 50 may be received within the HVAC system 10, and at least another portion of the filtration system 50 may be disposed external to the HVAC system 10. In some cases, the filtration system 50 may be removably received within the HVAC system 10.

The filtration system 50 may filter air that is drawn therethrough, thereby preventing undesired particles from proceeding through ducts to an internal environment that is to be heated, cooled, or otherwise conditioned by the HVAC system 10.

Figure 1B:
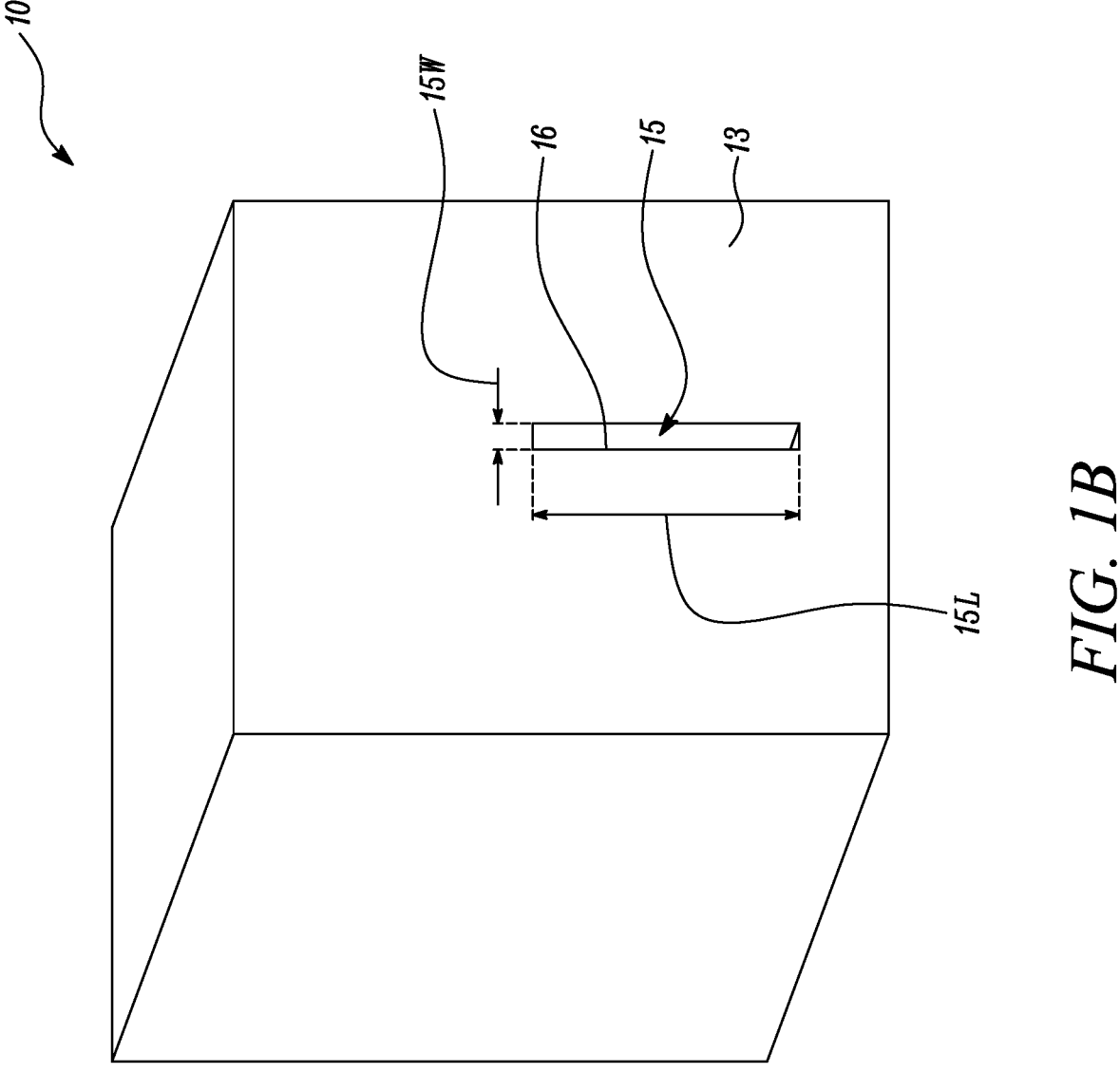
FIG. 1B illustrates a schematic perspective view of the HVAC system of FIG. 1A with a filtration system removed.

FIG. 1B illustrates a schematic perspective view of the HVAC system 10 with the filtration system 50 removed from the HVAC system 10. Referring to FIGS. 1A and 1B, the HVAC system includes a filter slot 15. The filter slot 15 may be at least partially defined by a wall 13 of the HVAC system 10. Further, the filtration system 50 may be at least partially received within the HVAC system 10 through the filter slot 15.

The filter slot 15 has a slot width 15W and a slot length 15L. The slot width 15W and the slot length 15L may vary based on a design of the HVAC system 10. For example, the slot width 15W may be 1 inch, 2 inches, 3 inches, 4 inches, and so forth, while the slot length 15L may be 7 inches, 8 inches, 9 inches, 10 inches, and so forth. Further, the filter slot 15 includes a wall 16. The wall 16 of the filter slot 15 may be at least partially defined by a portion of the wall 13 of the HVAC system 10.

Figure 2A:
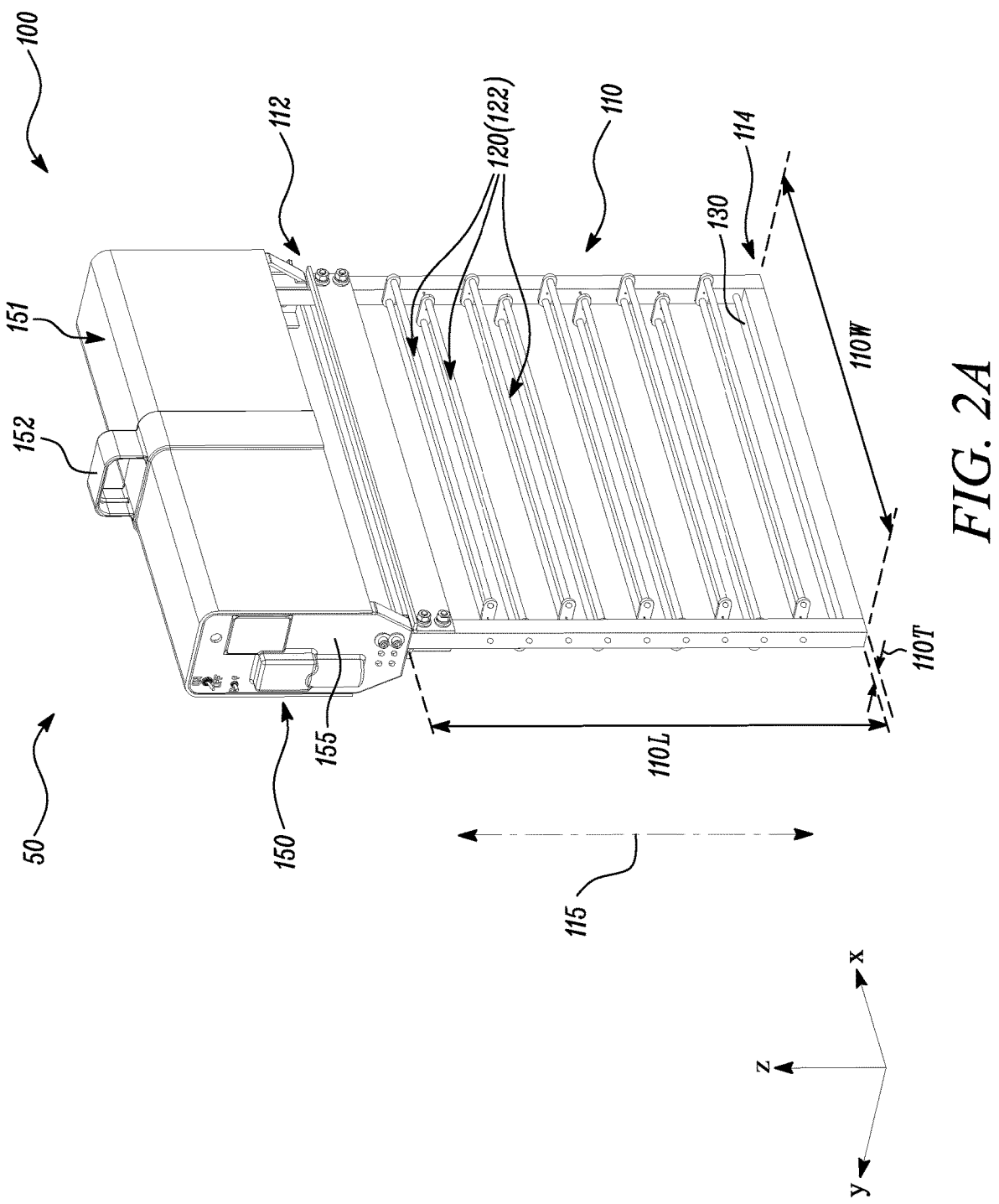
FIG. 2A illustrates a schematic perspective view of the filtration system according to an embodiment of the present disclosure.
Figure 2B:
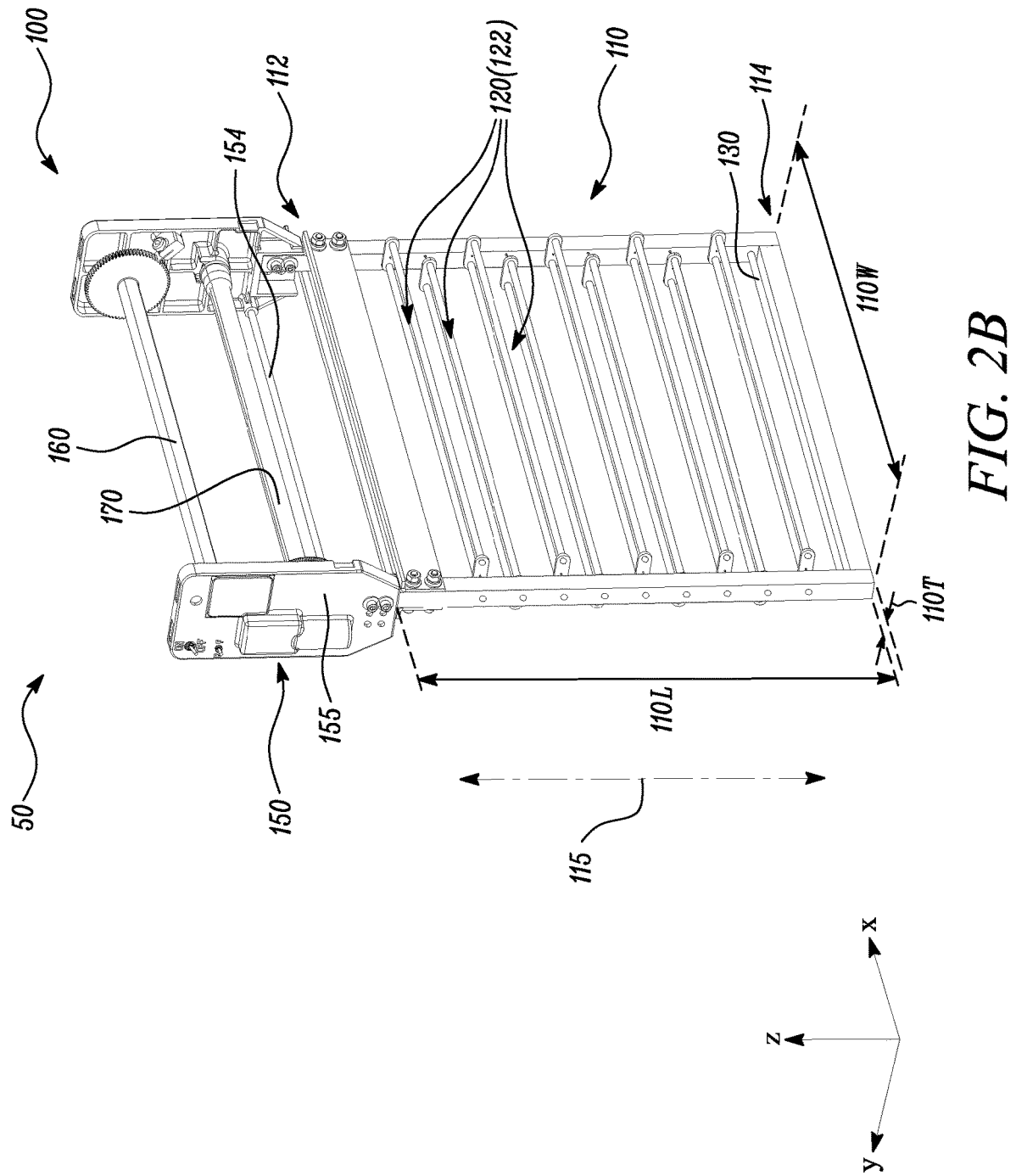
FIG. 2B illustrates a schematic perspective view of the filtration system of FIG. 2A with a spindle cover removed according to an embodiment of the present disclosure.

FIGS. 2A and 2B illustrate schematic perspective views of the filtration system 50 for the HVAC system 10 (shown in FIGS. 1A and 1B) according to an embodiment of the present disclosure.

Referring to FIG. 2A, the filtration system 50 defines mutually orthogonal x, y, and z-axes. The x-axis is defined along a width of the filtration system 50, while the y-axis is defined along a thickness of the filtration system 50. The z-axis is defined along a length of the filtration system 50.

Though not depicted in FIG. 2A or 2B, the filtration system 50 includes filter media including a filter web (shown in FIG. 6 and described in further detail below). The filtration system 50 further includes a filter frame assembly 100. The filter frame assembly 100 supports the filter web, as described below relative to FIG. 6.

The filter frame assembly 100 includes a main frame 110. The main frame 110 includes a first end 112, a second end 114 opposing the first end 112, and a longitudinal axis 115 extending from the first end 112 to the second end 114. The longitudinal axis 115 may be substantially parallel to the z-axis.

The main frame 110 may further include a maximum frame thickness 110T. The maximum frame thickness 110T may refer to a maximum thickness of the main frame 110 perpendicular to the longitudinal axis 115. The maximum frame thickness 110T may be defined substantially along the y-axis.

The main frame 110 may further include a maximum frame face width 110W. The maximum frame face width 110W may refer to a maximum width of the main frame 110 perpendicular to the longitudinal axis 115 and the maximum frame thickness 110T. The maximum frame face width 110W may be defined substantially along the x-axis.

The main frame 110 may further include a maximum frame length 110L. The maximum frame length 110L may refer to a maximum length of the main frame 110 along the longitudinal axis 115. The maximum frame length 110L may be defined between the first end 112 and the second end 114 of the main frame 110 along the longitudinal axis 115.

Referring to FIGS. 1B and 2A, the maximum frame face width 110W and the maximum frame thickness 110T of the main frame 110 may be less than or equal to the slot length 15L and the slot width 15W, respectively, of the filter slot 15 of the HVAC system 10. In other words, the maximum frame face width 110W may be less than or equal to the slot length 15L, and the maximum frame thickness 110T may be less than or equal to the slot width 15W. As a result, the main frame 110 is at least partially insertable through the filter slot 15 of the HVAC system 10 from the second end 114.

In some examples, as shown in FIG. 2A, the filter frame assembly 100 may further include a plurality of louvers 120 movably coupled to the main frame 110 and spaced apart from each other along the longitudinal axis 115. Each louver 120 from the plurality of louvers 120 may be movable relative to the main frame 110 between an expanded position 122 and a contracted position 124 (shown in FIG. 5B). Each of the plurality of louvers 120 is illustrated in the expanded position 122 in FIG. 2A. It may be noted that while a specific design of the plurality of louvers 120 is illustrated in FIG. 2A, the plurality of louvers 120 may have other shapes and designs based on desired application attributes. Furthermore, an arrangement of the plurality of louvers 120 may change based on desired application attributes.

The plurality of louvers 120 may be movably coupled to the main frame 110 by any suitable method or mechanism. In some examples, the plurality of louvers 120 may be pivotally coupled to the main frame 110. Therefore, each louver 120 may pivotally move between the expanded position 122 and the contracted position 124 (shown in FIG. 5B). In some other examples, the plurality of louvers 120 may be movably coupled to the main frame 110 by mechanical linkages, such that each louver 120 may move between the expanded position 122 and the contracted position 124.

The filter frame assembly 100 may further include an end member 130 fixedly coupled to the main frame 110. The end member 130 may be disposed adjacent to the second end 114 of the main frame 110. In some examples, the end member 130 may be disposed between one louver 120 from the plurality of louvers 120 and the second end 114 along the longitudinal axis 115 (or the z-axis). The end member 130 is illustrated as tubular (or cylindrical) in FIG. 2A, however, the end member 130 may be of any suitable shape, such as cuboidal, polygonal, etc.

The filter frame assembly 100 further includes a spindle unit 150 disposed at the first end 112 of the main frame 110. The main frame 110 is at least partially insertable through the filter slot 15 (shown in FIG. 1B) of the HVAC system 10 from the second end 114, such that the main frame 110 is at least partially received within the HVAC system 10 and the spindle unit 150 is disposed external to the HVAC system 10 (as shown in FIG. 1A). Specifically, the main frame 110 may be at least partially and removably received within the HVAC system 10 through the filter slot 15, such that the spindle unit 150 is disposed external to the HVAC system 10.

The spindle unit 150 includes a spindle frame 155 coupled to the main frame 110 and extending from the first end 112 of the main frame 110.

As shown in FIG. 2A, the filter frame assembly 100 may further include a spindle cover 151 removably coupled to spindle frame 155. The spindle cover 151 may be removably coupled to the spindle frame 155 by any suitable means, for example, a latching mechanism, such as spring clips, screws, or other fasteners, complementary mating features, and/or snap on features. The spindle cover 151 may at least partially cover the spindle unit 150 and protect components of the spindle unit 150 from external dust and undesired contaminants when the filtration system 50 is at least partially received within the filter slot 15 (shown in FIG. 1B) of the HVAC system 10.

The spindle cover 151 may optionally include a cover handle 152. The cover handle 152 may be grasped to carry the filtration system 50. In some cases, when the spindle cover 151 is to be detached from the spindle frame 155, the cover handle 152 may be grasped and pulled in order to remove the spindle cover 151 from the spindle frame 155. Therefore, the cover handle 152 may facilitate removal of the spindle cover 151 from the spindle frame 155.

FIG. 2B illustrates a schematic perspective view of the filtration system 50 with the spindle cover 151 removed from the spindle frame 155.

As discussed above, the spindle unit 150 includes the spindle frame 155 coupled to the main frame 110. The spindle frame 155 may be coupled to the main frame 110 by any suitable coupling and fastening means. For example, as shown in FIG. 2B, the spindle frame 155 may be coupled to the main frame 110 by nuts and bolts.

The spindle unit 150 further includes a dispensing spindle 160 non-rotatably coupled to the spindle frame 155. In other words, the dispensing spindle 160 does not rotate relative to the spindle frame 155. Any suitable method of coupling may be employed to achieve the non-rotatable coupling of the dispensing spindle 160 to the spindle frame 155.

The spindle unit 150 further includes a receiving spindle 170 spaced apart from the dispensing spindle 160 and rotatably coupled to the spindle frame 155. In other words, the receiving spindle 170 is rotatable relative to the spindle frame 155. The receiving spindle 170 may be manually rotatable (e.g., via a handle) or automatically driven (e.g., via a motor and gearing arrangement).

Each of the dispensing spindle 160 and the receiving spindle 170 is configured to at least partially receive a filter web of filter media thereon in a wound configuration, such that the filter web extends from the dispensing spindle 160 towards the second end 114 of the main frame 110 and extends back to the receiving spindle 170, while being at least partially received in the main frame 110. The filter media and configurations of the filter web with respect to the main frame 110 will be described in detail later.

As shown in FIG. 2B, the receiving spindle 170 may be disposed proximal to the first end 112 of the main frame 110 and the dispensing spindle 160 may be disposed distal to the first end 112 of the main frame 110, such that the receiving spindle 170 is disposed between the dispensing spindle 160 and the first end 112 of the main frame 110. Specifically, in FIG. 2B, the receiving spindle 170 is disposed between the dispensing spindle 160 and the first end 112 of the main frame 110 along the longitudinal axis 115. Such an arrangement of the receiving spindle 170 and the dispensing spindle 160 may reduce or prevent transfer of dust and/or contaminants from a portion of the filter web disposed on the receiving spindle 170 to a portion of the filter web disposed on the dispensing spindle 160.

Alternatively, the dispensing spindle 160 may be disposed proximal to the first end 112 of the main frame 110 and the receiving spindle 170 may be disposed distal to the first end 112 of the main frame 110, such that the dispensing spindle 160 is disposed between the receiving spindle 170 and the first end 112 of the main frame 110. It may be noted that locations of the dispensing spindle 160 and the receiving spindle 170 may be interchanged if desired. Further, each of the dispensing spindle 160 and the receiving spindle 170 may be removably mounted on the spindle frame 155. Therefore, the dispensing spindle 160 and the receiving spindle 170 may be replaced when required. Further, as each of the dispensing spindle 160 and the receiving spindle 170 is disposed at the first end 112 of the main frame 110, the filtration system 50 and the filter frame assembly 100 may be used with HVAC systems with a filter slot having a single opening (e.g., the filter slot 15 of the HVAC system 10 shown in FIG. 1B).

The filter frame assembly 100 may further include a web guiding member 154 fixedly coupled to the spindle frame 155. The web guiding member 154 may be disposed adjacent to the first end 112 of the main frame 110. In some examples, the web guiding member 154 may be disposed between one of the dispensing spindle 160 and the receiving spindle 170 (the one proximal to the first end 112 of the main frame 110) and the first end 112 of the main frame 110 along the longitudinal axis 115 (or the z-axis). The web guiding member 154 may at least partially receive the filter web thereon and further guide the filter web as it extends from the dispensing spindle 160 towards the second end 114 of the main frame 110.

Figure 3:
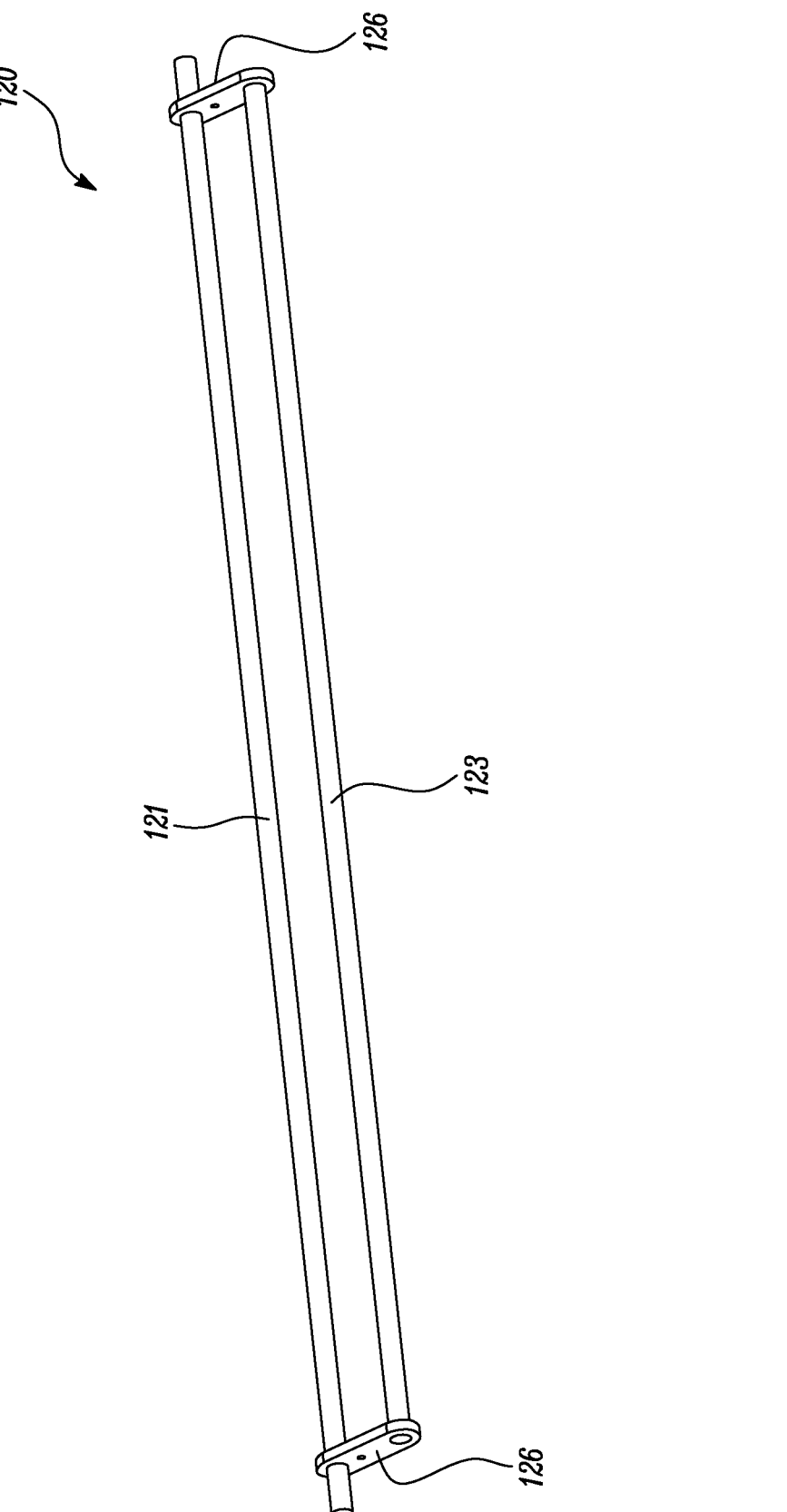
FIG. 3 illustrates a schematic perspective view of a louver of the filtration system of FIG. 2A according to an embodi-ment of the present disclosure.

FIG. 3 illustrates a schematic perspective view of one louver 120 from the plurality of louvers 120 according to an embodiment of the present disclosure.

Each louver 120 may include a proximal tubular portion 121 and a distal tubular portion 123 spaced apart from the proximal tubular portion 121. Each of the proximal tubular portion 121 and the distal tubular portion 123 may be configured to at least partially receive the filter web thereon.

Each louver 120 may further include a pair of connecting portions 126 spaced apart from each other and coupled to each of the proximal tubular portion 121 and the distal tubular portion 123. Each of the pair of connecting portions 126 may extend between the proximal tubular portion 121 and the distal tubular portion 123, such that the pair of connecting portions 126 couple the distal tubular portion 123 to the proximal tubular portion 121.

Figure 4A:
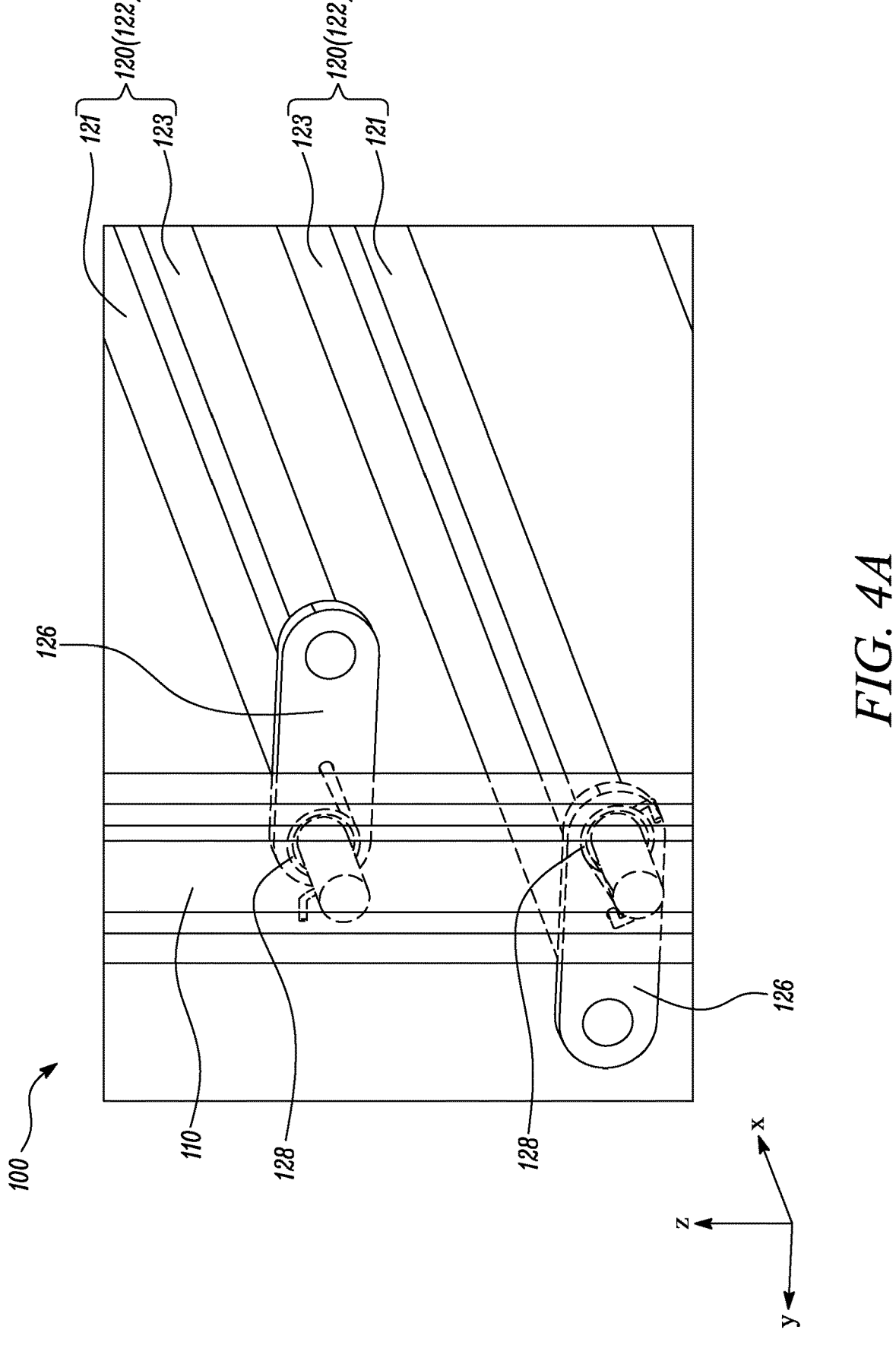
FIG. 4A illustrates a schematic perspective view of a portion of a filter frame assembly of the filtration system of FIG. 2A according to an embodiment of the present disclo-sure.

FIG. 4A illustrates a schematic perspective view of a portion of the filter frame assembly 100 according to an embodiment of the present disclosure.

The proximal tubular portion 121 may be pivotally coupled to the main frame 110 and the distal tubular portion 123 may be decoupled from the main frame 110. In the expanded position 122, each of the pair of connecting portions 126 (only one shown in FIG. 4A) may extend outwardly from the main frame 110, such that the distal tubular portion 123 is spaced apart from the main frame 110.

Furthermore, each louver 120 may be biased towards the expanded position 122. Each louver 120 may be biased towards the expanded position 122 by any suitable mechanism (e.g., by springs, mechanical linkages, etc.). Specifically, as shown in FIG. 4A, the filter frame assembly 100 may further include a plurality of springs 128 corresponding to the plurality of louvers 120. Each spring 128 from the plurality of springs 128 may be coupled to the main frame 110 and a corresponding louver 120 from the plurality of louvers 120. Each spring 128 may bias the corresponding louver 120 towards the expanded position 122. Each spring 128 may be disposed between the main frame 110 and one of the pair of connecting portions 126 along the x-axis.

For example, as shown in FIG. 4A, each spring 128 may be a torsional spring including a pair of tangs, with one of the pair of tangs coupled to the main frame 110, and the other of the pair of tangs coupled to one of the pair of connecting portions 126, such that the torsional spring biases the corresponding louver 120 towards the expanded position 122. The main frame 110 and the pair of connecting portions 126 may include suitable apertures to receive the corresponding pair of tangs.

Figure 4B:
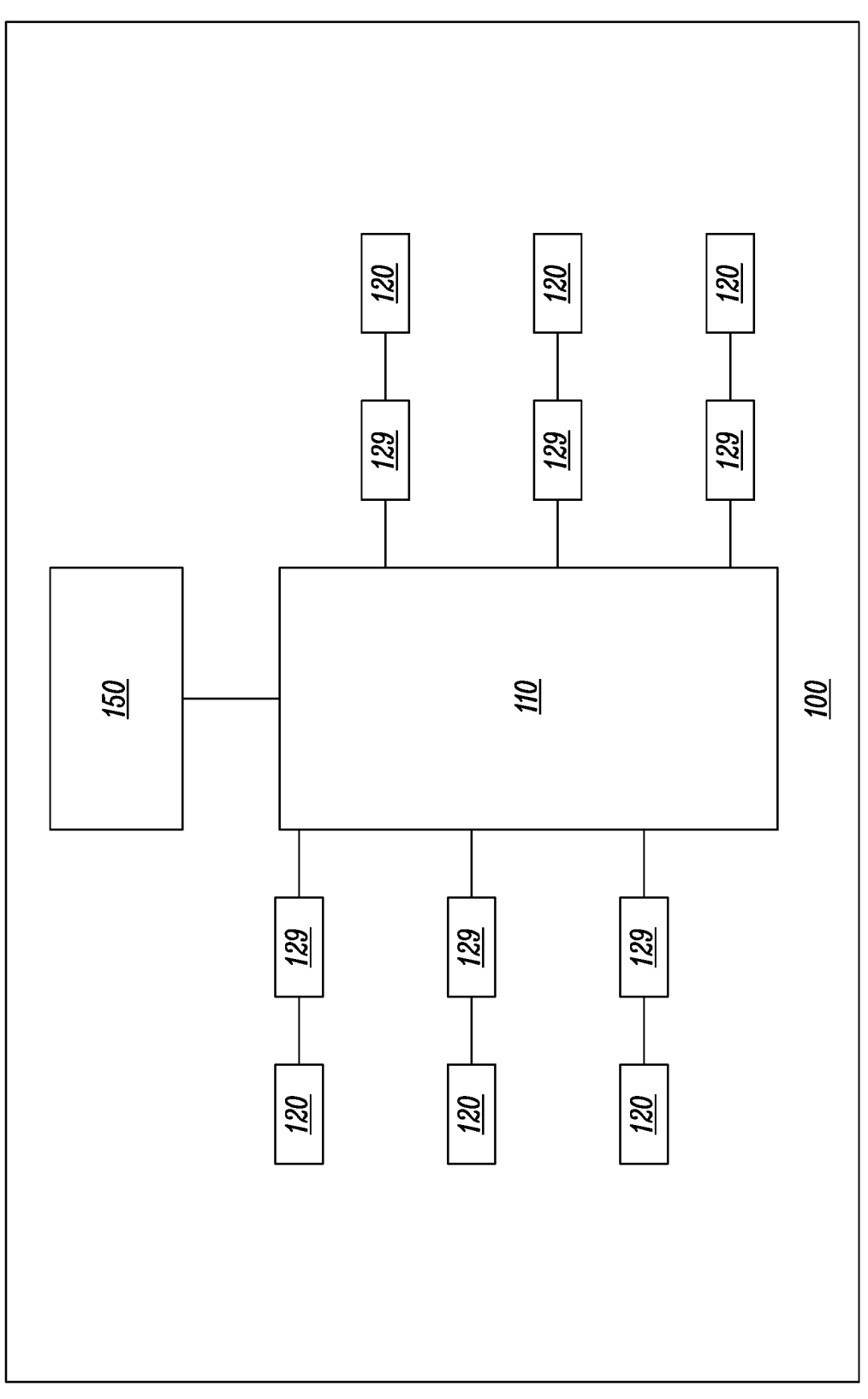
FIG. 4B illustrates a schematic block diagram of the filter frame assembly of the filtration system of FIG. 2A according to another embodiment of the present disclosure.

FIG. 4B illustrates a schematic block diagram of the filter frame assembly 100 according to another embodiment of the present disclosure. Some components of the filter frame assembly 100 are not shown in FIG. 4B for illustrative purposes.

As shown in FIG. 4B, the filter frame assembly 100 may further include a plurality of mechanical linkages 129 corresponding to the plurality of louvers 120. Each mechanical linkage 129 from the plurality of mechanical linkages 129 may be coupled to the main frame 110 and a corresponding louver 120 from the plurality of louvers 120. Each mechanical linkage 129 may bias the corresponding louver 120 towards the expanded position 122 (e.g., as shown in FIG. 4A). Each mechanical linkage 129 may include a plurality of links coupled to each other.

Figures 5A, 5B, 5C:
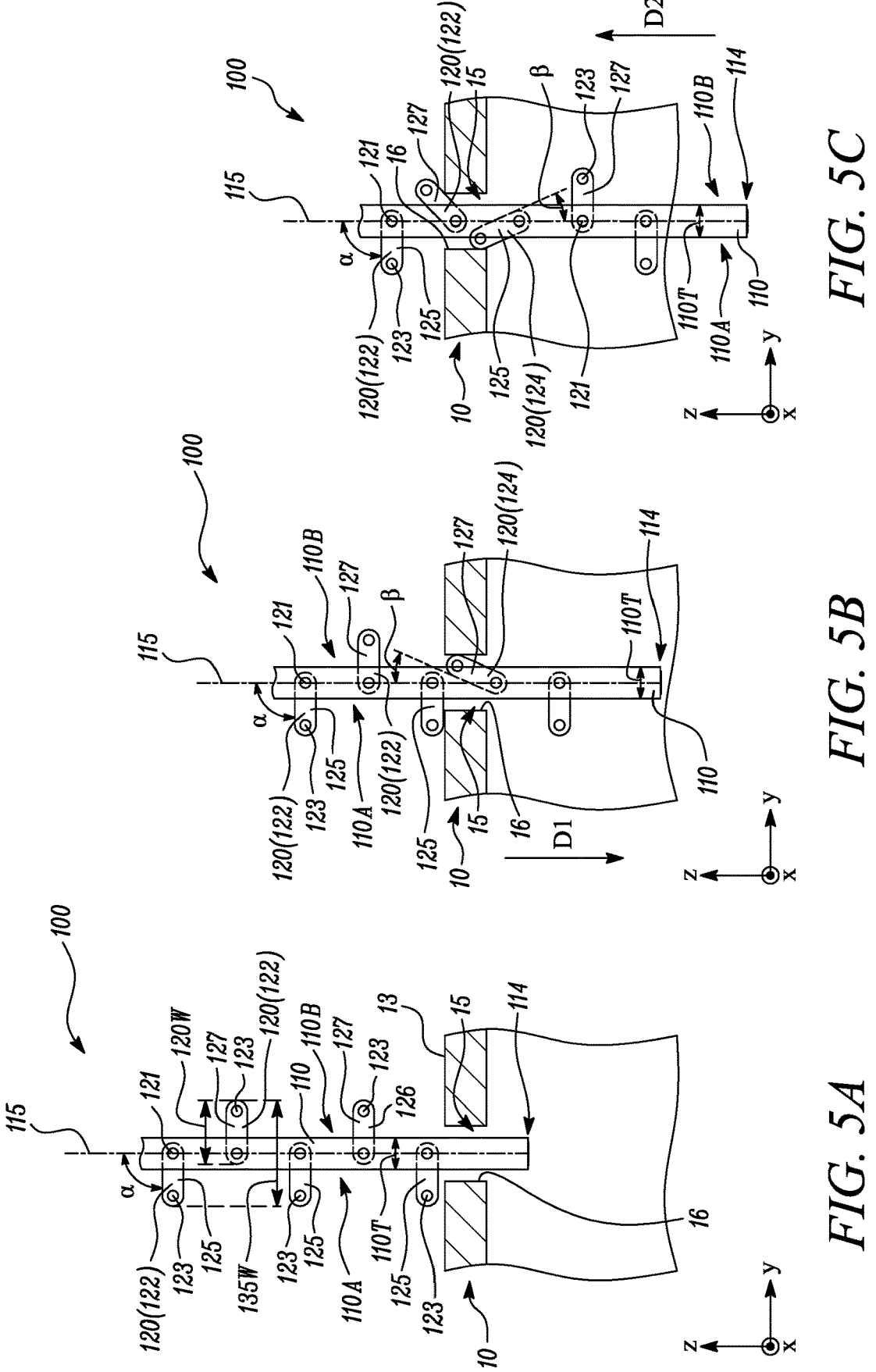
FIGS. 5A-5C illustrate schematic side views of a portion of the filtration system in different configurations according to an embodiment of the present disclosure.

FIGS. 5A-5C illustrate schematic side views of a portion of the filter frame assembly 100 in different configurations according to an embodiment of the present disclosure. A portion of the HVAC system 10 is schematically illustrated in FIGS. 5A-5C and is cross-hatched for illustrative purposes.

The maximum frame thickness 110T of the main frame 110 may be less than or equal to the slot width 15W of the filter slot 15 of the HVAC system 10. Therefore, the main frame 110 is at least partially insertable through the filter slot 15 from the second end 114. Further, a maximum louver width 120W of each louver 120 may be greater than the maximum frame thickness 110T of the main frame 110. In some examples, the maximum louver width 120W may be greater than the maximum frame thickness 110T by a factor of at least 1.5. Therefore, the maximum louver width 120W of each louver 120 may further be greater than the slot width 15W of the filter slot 15 of the HVAC system 10.

As discussed above, each louver 120 may be movable relative to the main frame 110 between the expanded position 122 and the contracted position 124.

In the expanded position 122, each louver 120 may extend outwardly from the main frame 110 and may be inclined relative to the longitudinal axis 115 by a first angle α. The first angle α may be any suitable angle, such that each louver 120 extends outwardly from the main frame 110. For example, the first angle α may be greater than or equal to 20 degrees. As shown in FIG. 5A, the first angle α may be about 90 degrees.

In the contracted position 124, each louver 120 may be inclined relative to the longitudinal axis 115 by a second angle β that is less than the first angle α. For example, the second angle may be greater than or equal to 0 degree and less than or equal to 20 degrees. As shown in FIG. 5B, the second angle β may be about 20 degrees. The second angle β may preferably be less than degrees.

As shown in FIGS. 5A-5C, during insertion of the plurality of louvers 120 through the filter slot 15 (e.g., along a first direction D1 shown in FIG. 5B), the plurality of louvers 120 may be configured to sequentially move from the respective expanded positions 122 to the respective contracted positions 124 due to engagement with the wall 16 of the filter slot 15. Further, after insertion of the plurality of louvers 120 through the filter slot 15, each louver 120 may be configured to move back to the expanded position 122 (as shown in FIG. 5C). Moreover, during removal of the plurality of louvers 120 from the filter slot 15 (e.g., along a second direction D2 shown in FIG. 5C), the plurality of louvers 120 may be configured to sequentially move from the respective expanded positions 122 to the respective contracted positions 124 due to engagement with the wall 16 of the filter slot 15.

Further, as shown in FIGS. 5A-5C, the plurality of louvers 120 may include a set of first louvers 125 and a set of second louvers 127. Each first louver 125 from the set of first louvers 125 may be disposed adjacent to a corresponding second louver 127 from the set of second louvers 127 along the longitudinal axis 115.

In the respective expanded positions 122, the pair of connecting portions 126 of each first louver 125 and the pair of connecting portions 126 of each second louver 127 may extend in opposite directions relative to the longitudinal axis 115, such that the distal tubular portion 123 of each first louver 125 and the distal tubular portion 123 of each second louver 127 are disposed on opposing sides 110A, 110B of the main frame 110. The opposing sides 110A, 110B may be defined with respect to the y-axis.

Furthermore, in the respective expanded positions 122, adjacent louvers 120 from the plurality of louvers 120 may extend outwardly from the main frame 110 in opposite directions relative to the longitudinal axis 115, such that a total width 135W defined by the adjacent louvers 120 perpendicular to the longitudinal axis 115 may be greater than the maximum frame thickness 110T of the main frame 110. The total width 135W may be defined by the adjacent louvers 120 substantially along the y-axis. The total width 135W may be greater than the maximum frame thickness 110T by a factor of at least 2. For example, the total width 135W may be greater than the maximum frame thickness 110T by a factor of 3, a factor of 4, and so forth. As a result, the plurality of louvers 120, in the respective expanded positions 122, may expand a capacity of the filter slot 15 by a factor of 4 (e.g., 1 inch to 4 inches). The plurality of 120 louvers may therefore allow the filter frame assembly 100 to be used with conventional filter slots and improve their capacities.

FIG. 6 illustrates a schematic side view of the filtration system 50 according to an embodiment of the present disclosure.

As discussed above, the filtration system 50 includes the filter media 60 including the filter web 62. Further, the filter frame assembly 100 supports the filter web 62. In other words, the filter frame assembly 100 is for use with the filter media 60 having the filter web 62.

The filter media 60 may include nearly any material, in any configuration, that is capable of filtering moving air. The filter media 60 may filter, for example, dust, common allergens, and viruses and bacteria from the moving air.

The filter media 60 may include, but is not limited to, fibrous materials (e.g., nonwoven webs, fiberglass webs, and so on), honeycomb structures loaded with filter media and/or sorbent material, and so on. In some examples, the filter media 60 may include at least one layer including a material that can be electrically or electrostatically charged to form an electret material. In some examples, the filter media 60 may be a multilayer media that includes at least one layer including an electret material, and at least one layer including a sorbent material. In some examples, the filter media 60 may include at least one layer capable of high efficiency particulate air (HEPA) filtration. The filter media 60 being electrostatically charged may enhance particulate capture, and may be used in electrostatic precipitators that have a current and ground wire and are typically washable.

For example, the filter media 60 can be constructed, for example, from nonwoven fibrous media formed of thermoplastics or thermosetting materials such as polyolefins including polypropylene, HDPE, LDPE, LLDPE and metallocene polyolefins; polyesters including aromatic and aliphatic polyesters, polyamides such as nylon 6, nylon 6,6, nylon 12, etc.; natural fibers including cellulose fibers such as rayon, cotton, and the like, acrylic fibers, olefin copolymers such as EMA, EVA and the like, Teflon, polyurethanes, polyvinyl chloride and combinations thereof. Other suitable, non-limiting materials for the filter media include porous foams, nonwovens, papers, fiberglass, or the like.

In some embodiments, the filter media 60 may comprise fiberglass fibers. Nonwoven webs which may be used as, or as a layer of, the filter media 60 can be a high loft spunbond web, such as described, for example, in U.S. Pat. No. 8,162,153 to Fox et al. In some embodiments, the filter media 60 can be, or include, a low loft spunbond web, such as those described in U.S. Pat. No. 7,947,142 to Fox et al. In some embodiments, an electrostatic charge is optionally imparted into or on to material(s) of the filter media 60. Thus, the filter media 60 can be an electret nonwoven web. Electric charge can be imparted to the filter media 60 in a variety of ways as is well known in the art, for example by hydrocharging, corona charging, etc. (e.g., as described in U.S. Pat. No. 7,947,142 to Shah et al.). In other embodiments, the filter media 60 is not electrostatically charged. Other non-limiting example of useful nonwoven web formats include bi-modal fiber diameter meltblown media such as that described in U.S. Pat. No. 7,858,163 (Angadjivand et al.).

In some embodiments, the filter media 60 may include one or more reinforcing layer or entities comprising, e.g., an open cell structure, a porous media, a nonwoven scrim, a netting, a wire mesh, or any such structure(s), which may be provided along with (e.g., bonded to) a layer that performs the actual filtration and which may be made of any suitable material. Whether inherently, or as assisted by reinforcing entities (e.g., set of extruded filaments, or a wire mesh), the filter media 60 will be sufficiently strong to survive the air pressure applied in conventional forced-air heating and/or cooling systems.

If at least one layer of the filter media 60 is to exhibit sorbent functionality, any suitable sorbent(s), in any convenient physical form, may be included in such a layer. In some examples, such a sorbent may be capable of capturing formaldehyde. Formaldehyde is a very light gas which may not be captured by typical carbon filters. Many carbon filters capture much heavier gases such as urea, cooking odors, etc. These carbon filters can use activated carbons. To capture formaldehyde and toluene gases, a treated (often acid treated) carbon may be used. In some examples, the sorbent may include at least some activated carbon. If desired, the activated carbon may be treated to enhance its ability to capture formaldehyde. Suitable treatments may, for example, provide the activated carbon with at least some amine functionality and/or at least some manganate functionality and/or at least some iodide functionality. Specific examples of treated activated carbons that may be suitable include those that have been treated with, for example, potassium permanganate, urea, urea/phosphoric acid, and/or potassium iodide. Other sorbents that may be potentially suitable for removing formaldehyde include, for example, treated zeolites and treated activated alumina. Such materials may be included, for example, along with treated activated carbon, if desired or required.

The one or more sorbents may be provided in any usable form; for example, as particles such as powder, beads, flakes, whiskers, granules, agglomerates, and the like. The sorbent particle size may vary as desired. The sorbent particles may be incorporated into or onto a layer of the filter media 60 in any desired fashion. For example, in various examples, the sorbent particles may be physically entangled with fibers of a layer of the filter media 60, may be adhesively bonded to such fibers, or some combination of both mechanisms may be used.

As shown in FIG. 6, each of the dispensing spindle 160 and the receiving spindle 170 is configured to at least partially receive the filter web 62 of the filter media 60 thereon in a wound configuration, such that the filter web 62 extends from the dispensing spindle 160 towards the second end 114 of the main frame 110 and extends back to the receiving spindle 170, while being at least partially received in the main frame 110. The wound configuration may be a spiral wound configuration, a radially wound configuration, and so forth.

Specifically, the dispensing spindle 160 may at least partially receive the filter web 62 thereon in a first wound configuration 64A and the receiving spindle 170 may at least partially receive the filter web 62 thereon in a second wound configuration 64B. The second wound configuration 64B may be same as or opposite to the first wound configuration 64A. Further, the filter web 62 may extend from the first wound configuration 64A on the dispensing spindle 160 towards the second end 114 of the main frame 110 and extend back to the second wound configuration 64B on the receiving spindle 170, while being at least partially received in the main frame 110.

Referring to FIGS. 1B, 5A-5C, and 6, when the main frame 110 is at least partially received within the HVAC system 10 through the filter slot 15 from the second end 114, the filter web 62 that is at least partially received in the main frame 110 may filter air that is drawn therethrough. Specifically, a main frame web portion of the filter web 62 may filter air that is drawn therethrough by the HVAC system 10. As a result, the main frame web portion of the filter web 62 may become ineffective or blocked over time by dust and other contaminants.

The filter web 62 that is wound on the dispensing spindle 160 may be fresh filter web (i.e., filter media that has not yet entered the HVAC system 10). As the receiving spindle 170 rotates (e.g., in a rotational direction RD), the fresh filter web may be dispensed from the dispensing spindle 160, and received at least partially in the main frame 110. Further, as the receiving spindle 170 rotates, the main web frame portion of the filter web 62 (which may be blocked by contaminants) may be collected from the main frame 110 onto the receiving spindle 170. Therefore, the receiving spindle 170 may be rotated (e.g., in the rotational direction RD) to circulate the fresh filter web from the dispensing spindle 160 and position the fresh filter web in the main frame 110, and simultaneously receive the contaminated main frame web portion of the filter web 62 thereon.

Further, it may be noted that the filter web 62 may be at least partially received in the main frame 110 in any suitable configuration. For example, the filter web 62 may be at least partially received in the main frame 110 in a zig-zag, in a generally U-shaped, in a generally V-shaped, in a linear configuration, or in any suitable combinations thereof.

As shown in FIG. 6, the filter web 62 may further be at least partially received on the web guiding member 154 as the filter web 62 extends from the first wound configuration 64A on the dispensing spindle 160 towards the second end 114 of the main frame 110.

Each louver 120 may at least partially receive the filter web 62 thereon. In some examples, the plurality of louvers 120 may be configured to at least partially receive the filter web 62 thereon in a zig-zag configuration. That is, the plurality of louvers 120 may at least partially receive the filter web 62 thereon in the zig-zag configuration. Further, each of the proximal tubular portion 121 and the distal tubular portion 123 may be configured to at least partially receive the filter web 62 thereon. That is, each of the proximal tubular portion 121 and the distal tubular portion 123 may at least partially receive the filter web 62 thereon.

Specifically, the proximal tubular portion 121 of each first louver 125 and the distal tubular portion 123 of each second louver 127 may be configured to at least partially receive the filter web 62 thereon in a first zig-zag configuration 66A as the filter web 62 extends from the dispensing spindle 160 towards the second end 114 of the main frame 110. As shown in FIG. 6, the proximal tubular portion 121 of each first louver 125 and the distal tubular portion 123 of each second louver 127 may at least partially receive the filter web 62 thereon in the first zig-zag configuration 66A as the filter web 62 extends from the first wound configuration 64A on the dispensing spindle 160 towards the second end 114 of the main frame 110.

Further, the distal tubular portion 123 of each first louver 125 and the proximal tubular portion 121 of each second louver 127 may be configured to at least partially receive the filter web 62 thereon in a second zig-zag configuration 66B as the filter web 62 extends back to the receiving spindle 170. As shown in FIG. 6, the distal tubular portion 123 of each first louver 125 and the proximal tubular portion 121 of each second louver 127 may at least partially receive the filter web 62 thereon in the second zig-zag configuration 66B as the filter web 62 extends back to the second wound configuration 64B on the receiving spindle 170.

The first zig-zag configuration 66A may be connected to the second zig-zag configuration 66B proximal to the second end 114 of the main frame 110. For example, as shown in FIG. 6, the end member 130 may at least partially receive the filter web 62 thereon, thereby connecting the first zig-zag configuration 66A to the second zig-zag configuration 66B. The connection of the first and second zig-zag configurations 66A, 66B results in the apex of a given pleat in one side of the filter web 62 corresponding to a valley of a given pleat in the opposing side of the filter web 62. In other words, a filter web received on a distal tubular portion 123 of a louver 120 on a first side of the filter web 62 will be received on the proximal tubular portion 121 of a louver 120 on the opposing side of the filter web 62. The filter web 62 may be at least partially wrapped around the end member 130, thereby enabling the filter web 62 to extend back towards the first end 112 of the main frame 110.

As discussed above, the plurality of louvers 120, in the respective expanded positions 122, may expand a capacity of the filter slot 15 (shown in FIGS. 5A-5C). In one example, the plurality of louvers 120, in the respective expanded positions 122, may expand the capacity of the filter slot by a factor of 4 (e.g., 1 inch to 4 inches), thereby reducing an overall pressure drop across the filter web 62, extending life of the filter web 62, and maintaining low pressure drop throughout a duration of use of the filtration system 50.

Figure 7:
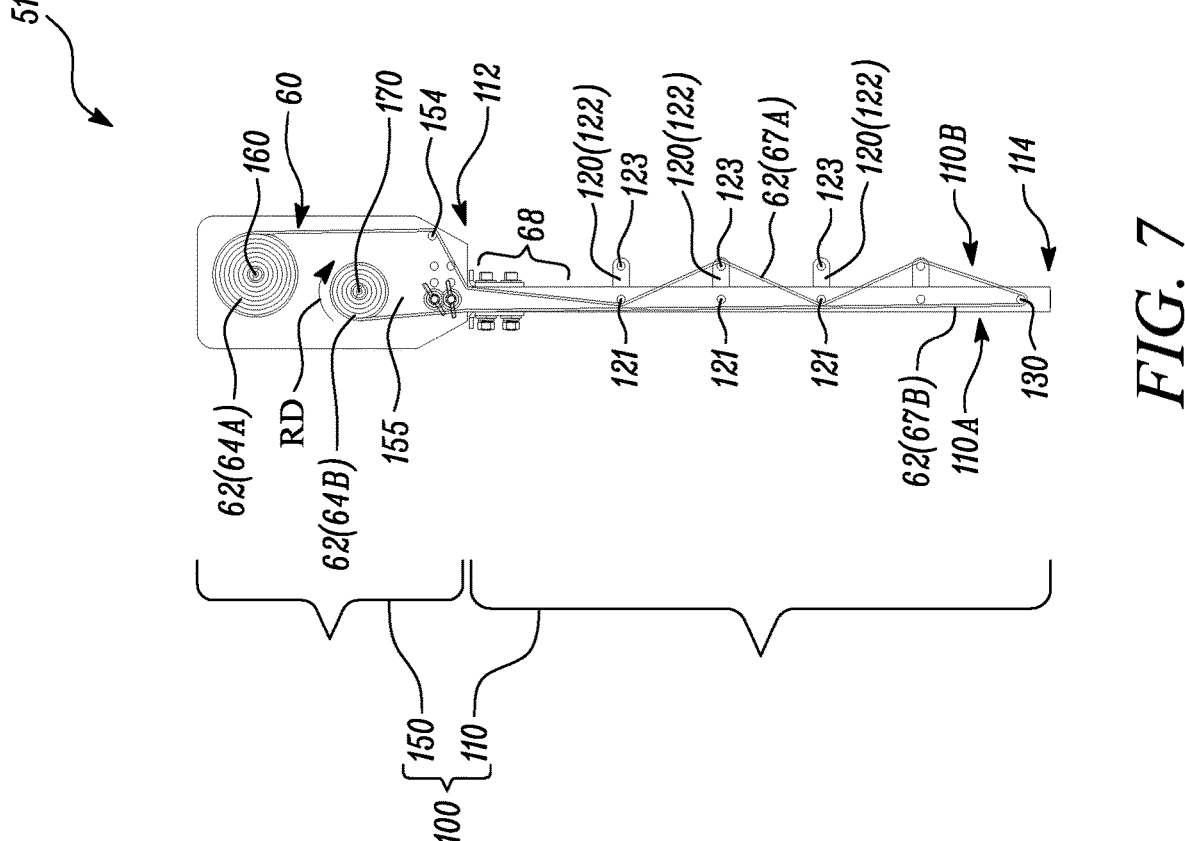
FIG. 7 illustrates a schematic side view of a filtration system according to another embodiment of the present disclosure.

FIG. 7 illustrates a schematic side view of a filtration system 51 according to another embodiment of the present disclosure. The filtration system 51 is similar to the filtration system 50 of FIG. 6, with like elements designated by like reference characters. However, the plurality of louvers 120 of the filtration system 51 have a different arrangement as compared to the filtration system 50.

As shown in FIG. 7, in the respective expanded positions 122, the pair of connecting portions 126 of each louver 120 may extend in a same direction relative to the longitudinal axis 115, such that the distal tubular portion 123 of each louver 120 is disposed on a same side (i.e., the side 110B in FIG. 7) of the main frame 110.

Further, the proximal tubular portion 121 and the distal tubular portion 123 of each louver 120 may be configured to at least partially receive the filter web 62 thereon in a zig-zag configuration 67A as the filter web 62 extends from the dispensing spindle 160 towards the second end 114 of the main frame 110. As shown in FIG. 7, the proximal tubular portion 121 and the distal tubular portion 123 of each louver 120 may at least partially receive the filter web 62 thereon in the zig-zag configuration 67A as the filter web 62 extends from the dispensing spindle 160 towards the second end 114 of the main frame 110. As depicted, the filter web 62 alternates between the proximal tubular portion 121 and the distal tubular portion 123 of the louvers 120 as the second end 114 is approached, creating ersatz pleats on one side of the filter web 62. Further, the filter web 62 may extend back to the receiving spindle 170 in a linear configuration 67B.

The zig-zag configuration 67A may be connected to the linear configuration 67B proximal to the second end 114 of the main frame 110. For example, as shown in FIG. 7, the end member 130 may at least partially receive the filter web 62 thereon, thereby connecting the zig-zag configuration 67A to the linear configuration 67B.

Figure 8:
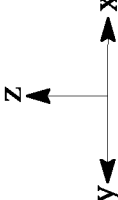
FIG. 8 illustrates a schematic perspective view of a filtration system according to another embodiment of the present disclosure.

FIG. 8 illustrates a schematic perspective view of a filtration system 52 according to another embodiment of the present disclosure. The filtration system 52 is similar to the filtration system 50 of FIG. 2A, with like elements designated by like reference characters. However, the filter frame assembly 100 of the filtration system 52 has a different configuration as compared to the filtration system 50. Specifically, as shown in FIG. 8, the filter frame assembly 100 may further include a plurality of tubular members 140 fixedly coupled to the main frame 110 and spaced apart from each other along the longitudinal axis 115.

Figure 9B:
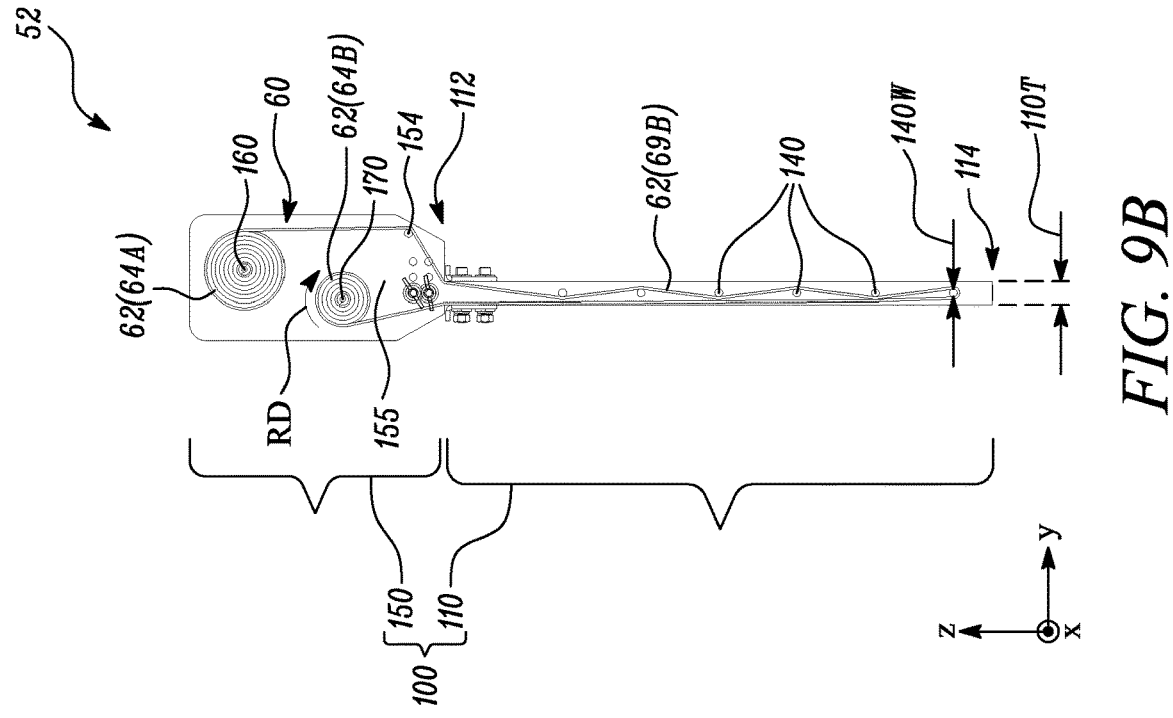
FIG. 9B illustrates a schematic side view of the filtration system of FIG. 8 according to another embodiment of the present disclosure.
Figure 9A:
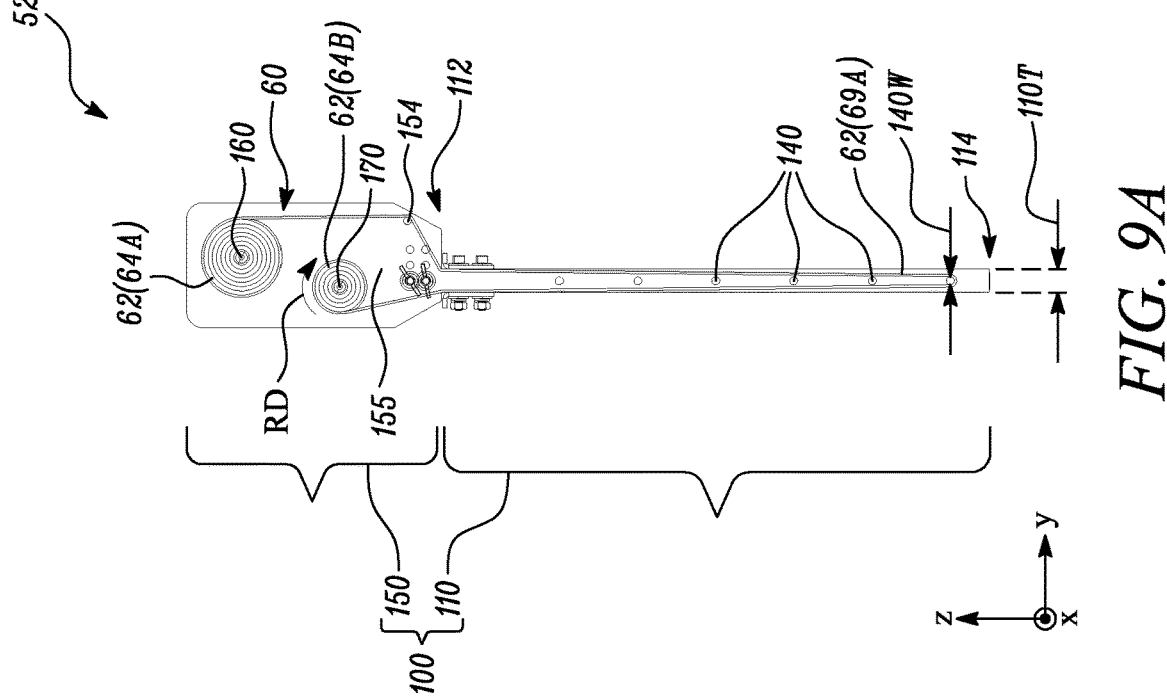
FIG. 9A illustrates a schematic side view of the filtration system of FIG. 8 according to an embodiment of the present disclosure.

FIGS. 9A and 9B illustrate schematic side views of the filtration system 52 according to different embodiments of the present disclosure.

Referring to FIGS. 9A and 9B, the plurality of tubular members 140 may be configured to at least partially receive the filter web 62 thereon in a substantially U-shaped configuration 69A (shown in FIG. 9A) or a zig-zag configuration 69B (shown in FIG. 9B) as the filter web 62 extends from the dispensing spindle 160 towards the second end 114 of the main frame 110 and extends back to the receiving spindle 170. The zig-zag configuration 69B may be adopted by alternating the position of the filter web 62 relative to the tubular members 140. Further, a maximum tubular width 140W of each tubular member 140 may be less than or equal to the maximum frame thickness 110T of the main frame 110. In some examples, the maximum tubular width 140W of each tubular member 140 may be less than the maximum frame thickness 110T by a factor of at least 2.

Figure 10A:
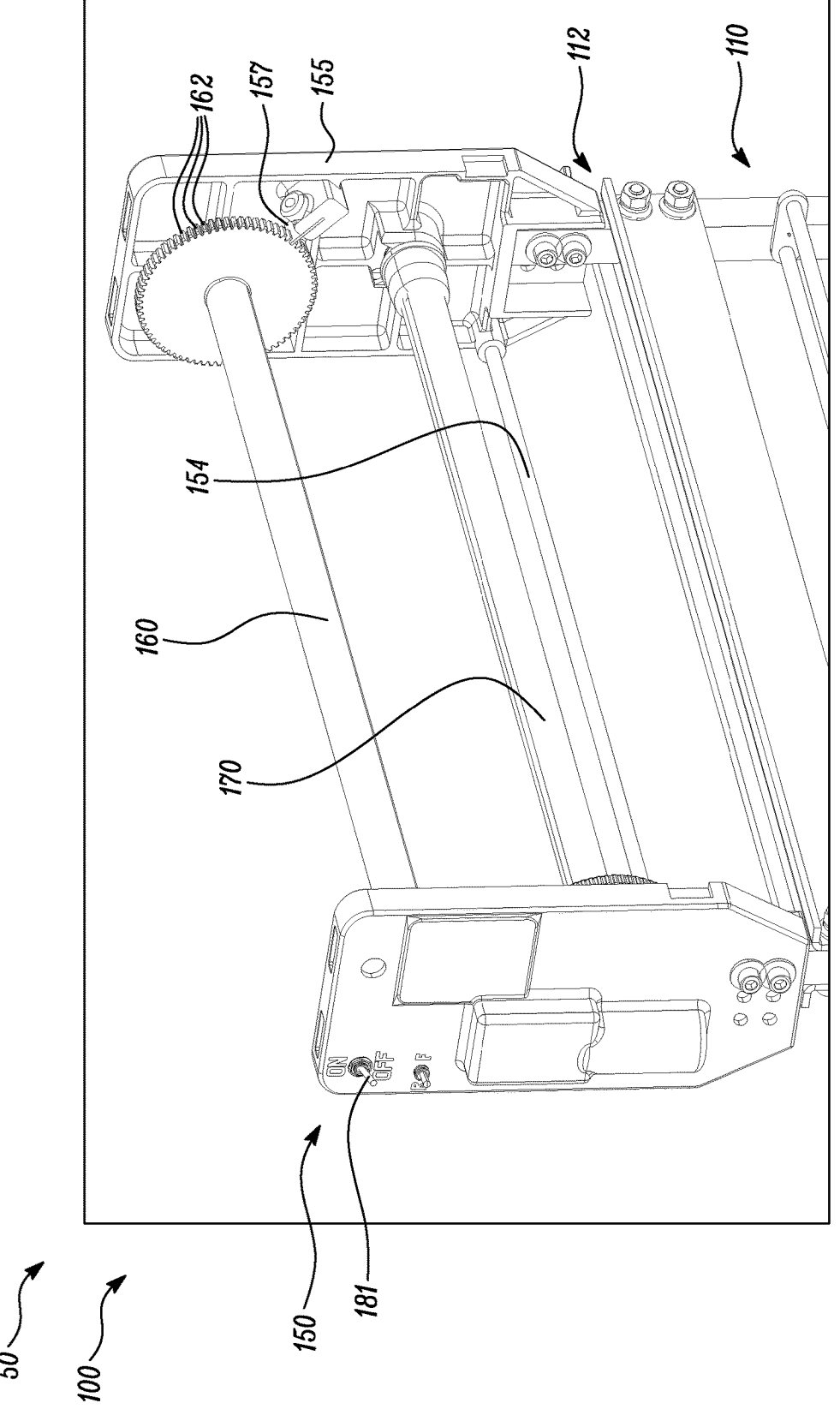
FIGS. 10A and 10B illustrate schematic perspective views of portions of the filtration system of FIG. 2B according to an embodiment of the present disclosure.
Figure 10B:
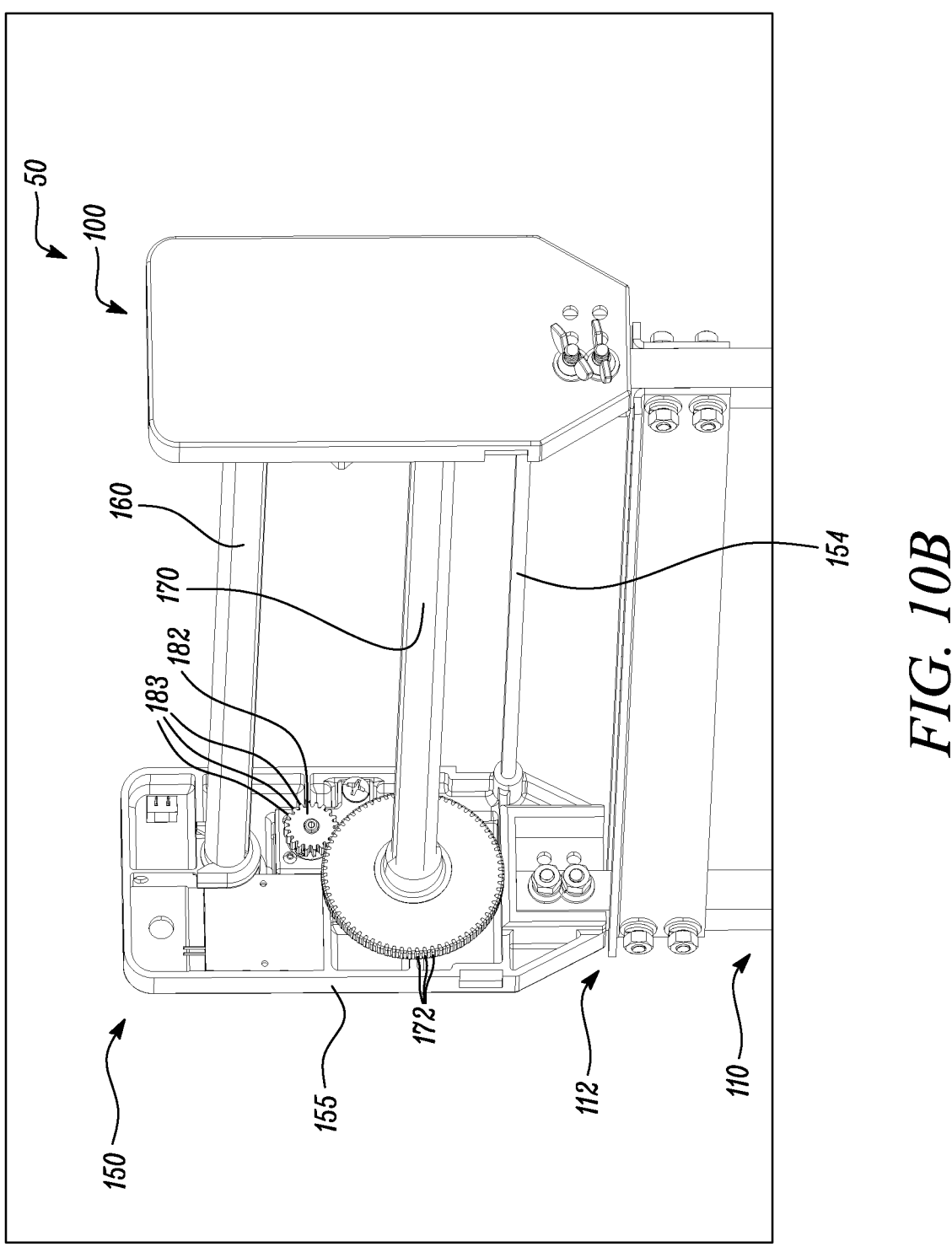

FIGS. 10A and 10B illustrate schematic perspective views of portions of the filtration system 50 according to an embodiment of the present disclosure.

Referring to FIG. 10A, the dispensing spindle 160 may include a plurality of teeth 162. The plurality of teeth 162 may be disposed at an end of the dispensing spindle 160. The plurality of teeth 162 may be part of a gear. Further, the spindle frame 155 may further include a ratchet tab 157 extending towards the dispensing spindle 160. One or more of the plurality of teeth 162 of the dispensing spindle 160 may lockingly engage with the ratchet tab 157, such that the dispensing spindle 160 is non-rotatably coupled to the spindle frame 155. In other words, the ratchet tab 157 may lock the dispensing spindle 160 in a fixed orientation relative to the spindle frame 155.

Figure 15B:
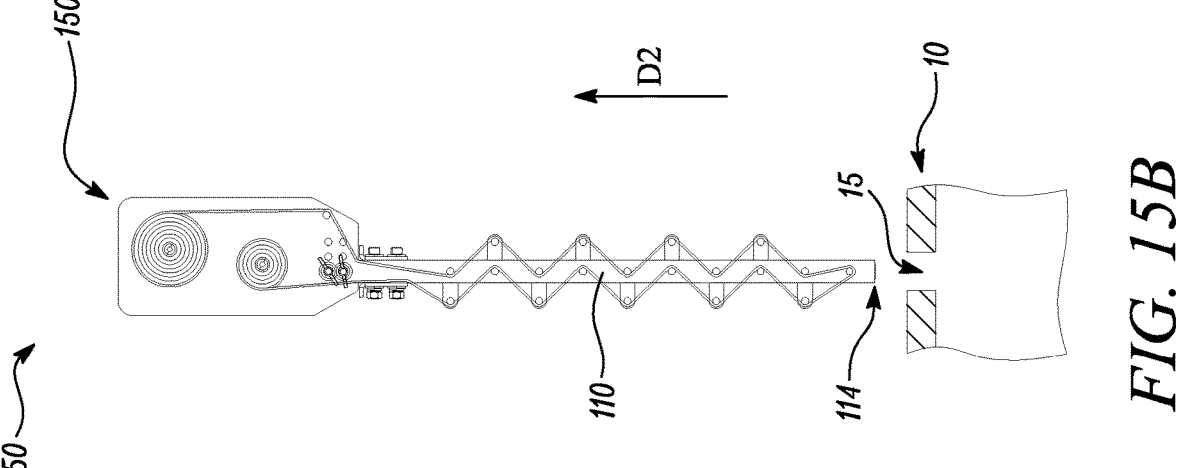
FIGS. 15A-15I schematically illustrate a method of using the filtration system according to an embodiment of the present disclosure.

Referring to FIG. 10B, the receiving spindle 170 may include a plurality of teeth 172. The plurality of teeth 172 may be disposed at an end of the receiving spindle 170. The plurality of teeth 172 may be part of a gear. The spindle unit 150 may further include a prime motor 180 (shown in FIG. 13). The prime motor 180 is also shown in FIG. 15C.

The prime motor 180 may include, for example, electrical motors, such as a direct current (DC) or an alternating current (AC) motor. Although not illustrated, the spindle unit 150 may further include a suitable power source, such as a battery, to power the prime motor 180.

The spindle unit 150 may further include a drive gear 182 drivingly coupled to the prime motor 180. The drive gear 182 may be further meshed with the plurality of teeth 172 of the receiving spindle 170. Specifically, the drive gear 182 may include a plurality of teeth 183 that mesh with the plurality of teeth 172 of the receiving spindle 170. Preferably, a gear ratio between the receiving spindle 170 and the drive gear 182 may be greater than 2:1, more preferably greater than 3:1, to facilitate rotation of the receiving spindle 170 by the prime motor 180 (shown in FIG. 13).

The prime motor 180 (shown in FIG. 13) may be configured to selectively rotate the receiving spindle 170 relative to the spindle frame 155 via the drive gear 182. The spindle unit 150 may further include a switch 181 (shown in FIG. 10A) configured to selectively activate and deactivate the prime motor 180 based on a user input. For example, the switch 181 may be turned on to activate the prime motor 180, and turned off to deactivate the prime motor 180. Alternatively, the receiving spindle 170 may be manually rotatable relative to the spindle frame 155, for example, by a crank (not shown).

Figures 11A, 11B:
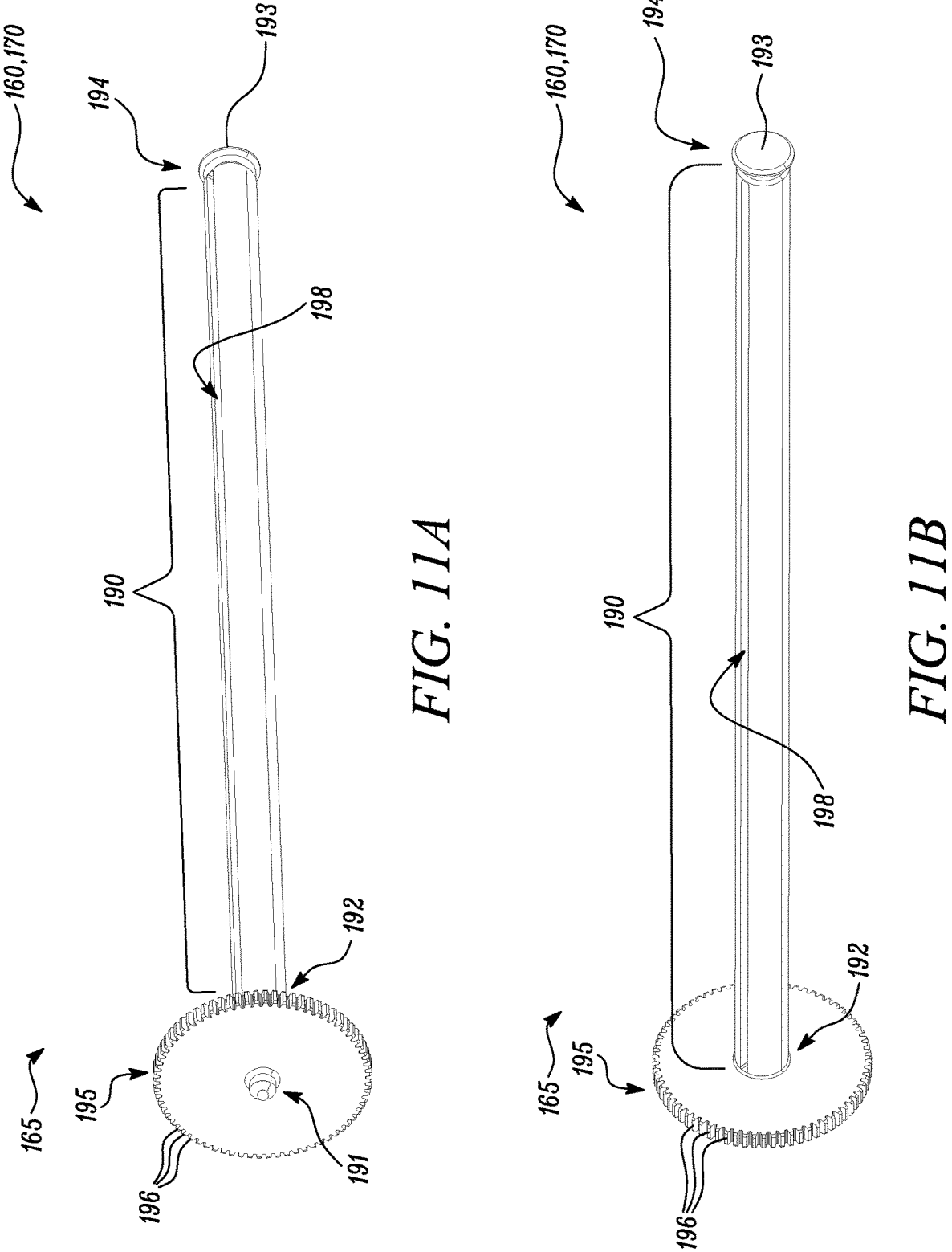
FIGS. 11A and 11B illustrate front and rear perspective views, respectively, of a spindle according to an embodi-ment of the present disclosure.

FIGS. 11A and 11B illustrate different perspective views of a spindle 165 according to an embodiment of the present disclosure. The spindle 165 may be used as the dispensing spindle 160 and/or the receiving spindle 170. In other words, the spindle 165 is for use with the filter media 60 having the filter web 62 (shown in FIG. 6). Therefore, the spindle 165 may be interchangeably referred to as the dispensing spindle 160 and/or the receiving spindle 170.

Each of the dispensing spindle 160 and the receiving spindle 170 may include a main tubular portion 190 including a first tubular end 192 and a second tubular end 194 opposite to the first tubular end 192. The main tubular portion 190 may be configured to at least partially receive the filter web 62 (shown in FIG. 6) thereon in the wound configuration. That is, the main tubular portion 190 may at least partially receive the filter web 62 thereon in the wound configuration. The main tubular portion 190 as depicted is generally cylindrical, with a substantially circular cross-section. In other embodiments, the main tubular portion 190 of either or both of the dispensing and receiving spindles 160, 170 may include a variety of cross-sectional shapes (e.g., ovular, rectangular, hexagonal, octagonal, dodecagonal, etc.).

Further, at least one of the dispensing or receiving spindles 160, 170 may include a spindle slot 198 configured to at least partially receive the filter web 62 therein. That is, the at least one of the dispensing or receiving spindles 160, 170 may include the spindle slot 198 at least partially receiving the filter web 62 therein. The spindle slot 198 may be defined by the main tubular portion 190 of the at least one of the dispensing spindle 160 and the receiving spindle 170. In some examples, the main tubular portion 190 may define the spindle slot 198 therethrough. The spindle slot 198 may extend along at least a portion of a length of the main tubular portion 190. The spindle slot 198 may facilitate winding of the filter web 62 (shown in FIG. 6) on the at least one of the dispensing or receiving spindles 160, 170, and more specifically, on the main tubular portion 190.

Moreover, each of the dispensing spindle 160 and the receiving spindle 170 may further include a gear portion 195 fixedly coupled to the main tubular portion 190 and disposed at the first tubular end 192 of the main tubular portion 190. The gear portion 195 may include a plurality of teeth 196. The plurality of teeth 196 may correspond to the plurality of teeth 162 (shown in FIG. 10A) of the dispensing spindle and/or the plurality of teeth 172 (shown in FIG. 10B) of the receiving spindle 170.

Each of the dispensing spindle 160 and the receiving spindle 170 may further include a first coupling portion 191 extending from the gear portion 195 opposite to the main tubular portion 190 and coupled to the spindle frame 155 (shown in FIGS. 10A and 10B). Each of the dispensing spindle 160 and the receiving spindle 170 may further include a second coupling portion 193 fixedly coupled to the main tubular portion 190 and disposed at the second tubular end 194 of the main tubular portion 190. The second coupling portion 193 may be coupled to the spindle frame 155 (shown in FIGS. 10A and 10B).

At least one of the dispensing spindle 160 and the receiving spindle 170 may be a single integral component, such that the main tubular portion 190, the gear portion 195, the first coupling portion 191, and the second coupling portion 193 are integral with each other. Alternatively, the dispensing spindle 160 and the receiving spindle 170 may be made from separate components, as described below.

Figures 12A, 12B:
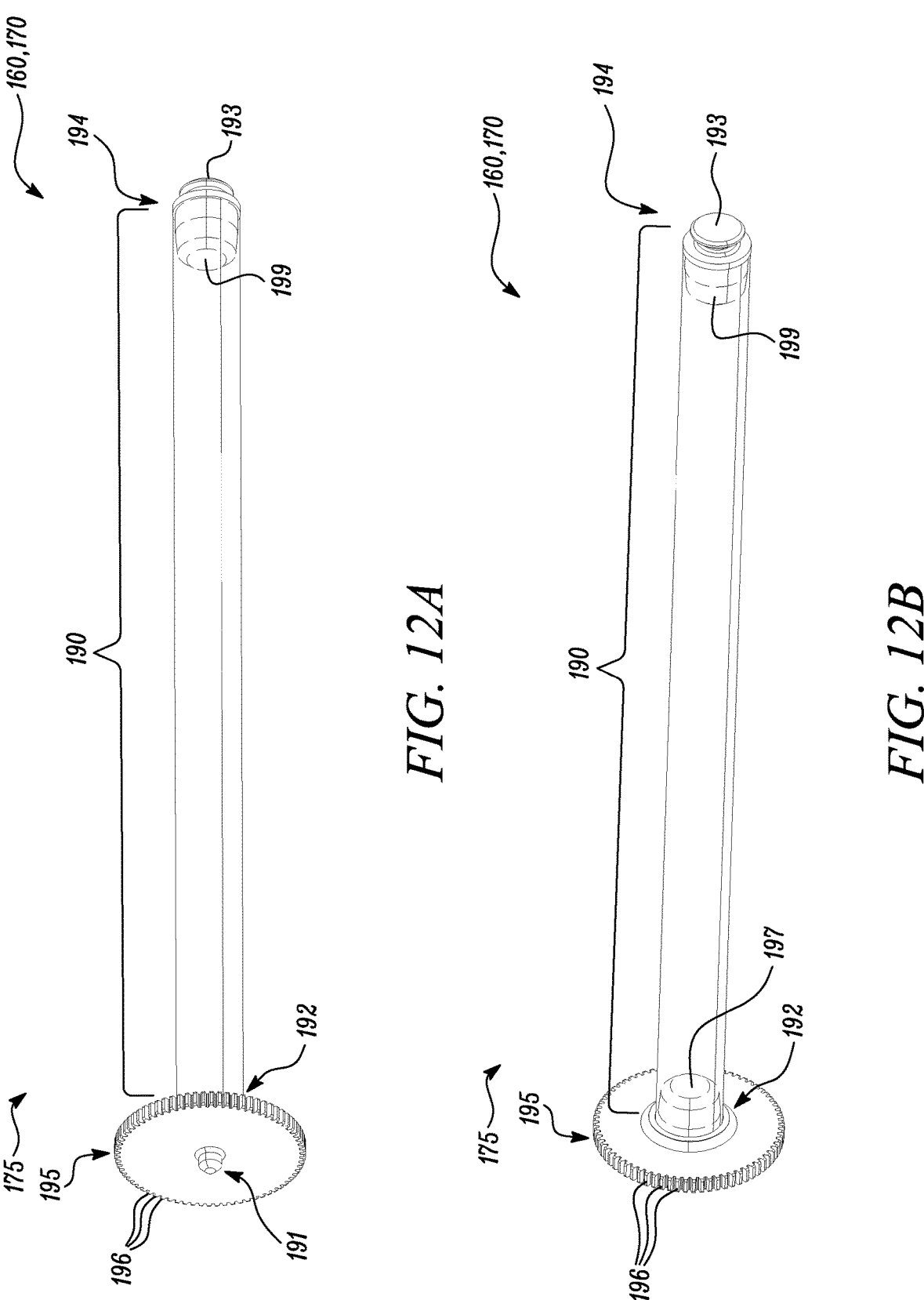
FIGS. 12A and 12B illustrate front and rear perspective views, respectively, of a spindle according to another embodiment of the present disclosure.

FIGS. 12A and 12B illustrate different perspective views of a spindle 175 according to an embodiment of the present disclosure. The spindle 175 may be used as the dispensing spindle 160 and/or the receiving spindle 170. Therefore, the spindle 175 may be interchangeably referred to as the dispensing spindle 160 and/or the receiving spindle 170. Components of the spindle 175 that are similar to components of the spindle 165 (shown in FIGS. 11A and 11B) are designated by like reference characters.

As shown in FIGS. 12A and 12B, for at least one of the dispensing spindle 160 and the receiving spindle 170, the main tubular portion 190 may be at least partially hollow. Further, at least the main tubular portion 190, the gear portion 195, and the second coupling portion 193 may be separate components.

The at least one of the dispensing spindle 160 and the receiving spindle 170 may further include a first projection 197 extending from the gear portion 195 opposite to the first coupling portion 191 and at least partially received within the main tubular portion 190, such that the first projection 197 fixedly couples the gear portion 195 and the first coupling portion 191 to the main tubular portion 190. For example, the first projection 197 may include fastening features, such as barbs, slots, tabs, and the like, to fixedly couple the gear portion 195 and the first coupling portion 191 to the main tubular portion 190. Additionally or alternatively, the first projection 197 may fixedly couple the gear portion 195 and the first coupling portion 191 to the main tubular portion 190 through glues or adhesives.

Furthermore, as shown in FIGS. 12A and 12B, the at least one of the dispensing spindle 160 and the receiving spindle 170 may further include a second projection 199 extending from the second coupling portion 193 and at least partially received within the main tubular portion 190, such that the second projection 199 fixedly couples the second coupling portion 193 to the main tubular portion 190. For example, the second projection 199 may include fastening features, such as barbs, slots, tabs, and the like, to fixedly couple the second coupling portion 193 to the main tubular portion 190. Additionally or alternatively, the second projection 199 may fixedly couple the second coupling portion 193 to the main tubular portion 190 through glues or adhesives.

Figure 13:
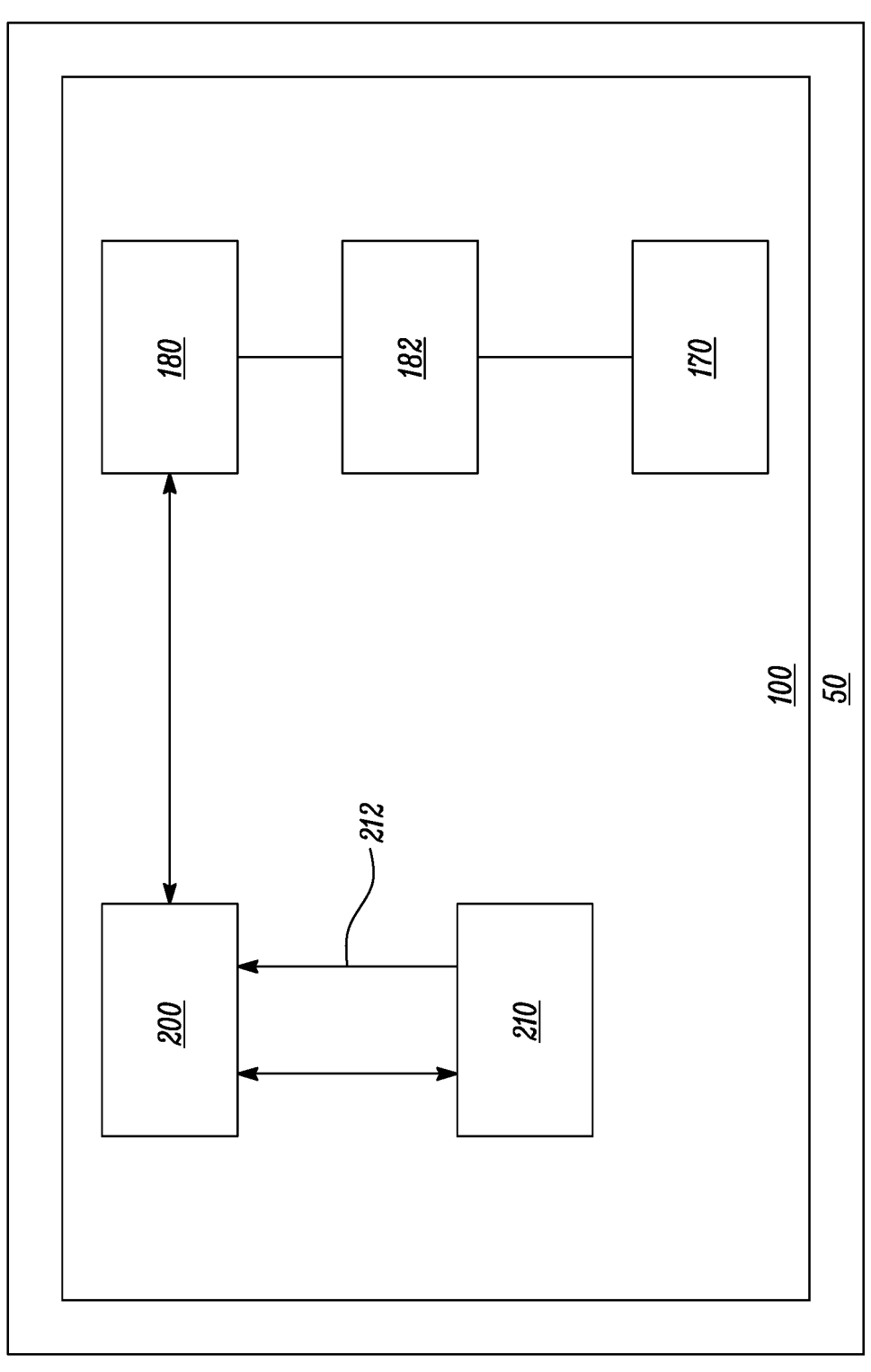
FIG. 13 illustrates a schematic block diagram of the filtration system according to an embodiment of the present disclosure.

FIG. 13 illustrates a schematic block diagram of the filter frame assembly 100 according to an embodiment of the present disclosure. Some components of the filter frame assembly 100 are not shown in FIG. 13 for illustrative purposes.

The filter frame assembly 100 may further include a controller 200 communicably coupled to the prime motor 180. The controller 200 may be communicably coupled to the prime motor 180 via a wired and/or a wireless connection. In some examples, the controller 200 may be disposed within the spindle frame 155 of the spindle unit 150. In some other examples, the controller 200 may be disposed external to the spindle frame 155 of the spindle unit 150.

Referring to FIGS. 6 and 13, the controller 200 may be configured to selectively activate the prime motor 180 in order to rotate the receiving spindle 170 relative to the spindle frame 155 and dispense a portion of the filter web 62 from the dispensing spindle 160. For example, upon rotation (e.g., in the rotational direction RD) of the receiving spindle 170 relative to the spindle frame 155, a predetermined length 68 of the filter web 62 may be dispensed from the dispensing spindle 160 and received on the receiving spindle 170 in the second wound configuration 64B. In other words, the receiving spindle 170 may unwind or unroll the filter web 62 from the dispensing spindle 160 and receive the unrolled filter web 62 thereon in the second wound configuration 64B during rotation thereof. Thus, a portion of the filter web 62 received in the main frame 110 may be controlled to change continuously, periodically, etc., based on desired application attributes.

As discussed above, a portion of the filter web 62 wound on the dispensing spindle 160 may be fresh filter web, and a portion of the filter web 62 wound on receiving spindle 170 may be used filter web. As the receiving spindle 170 rotates, the fresh filter web may dispense from the dispensing spindle 160 onto the main frame 110, and the used filter web (which may have accumulated excess contaminants) may be collected from the main frame 110 onto the receiving spindle 170.

The controller 200 may be further configured to periodically activate the prime motor 180 on a time-based interval (e.g., continuously, every 1 second, every 1 minute, every 1 hour, every 1 week, etc.), in order to periodically dispense the predetermined length 68 (e.g., 1 centimeter, 5 centimeters, 10 centimeters, etc.) of the filter web 62 from the dispensing spindle 160. That is, the controller 200 may periodically activate the prime motor 180 to periodically rotate the receiving spindle 170 to unroll the filter web 62 from the dispensing spindle 160, such that the predetermined length 68 of the filter web 62 is dispensed from the dispensing spindle 160 and received on the receiving spindle 170. Consequently, the predetermined length 68 of the filter web 62 may be periodically received on the receiving spindle 170 in the second wound configuration 64B. It may be noted that the time-based interval and the predetermined length 68 of the filter web 62 may vary based on application attributes. Further, the predetermined length 68, as shown in FIG. 6, is for illustrative purposes only and does not limit the scope of the present disclosure. In some cases, the predetermined length 68 may correspond to a total length of the filter web 62 that is disposed in and around the main frame 110, i.e., a total active length of the filter web 62 that is performing filtration.

Additionally or alternatively, the controller 200 may be configured to periodically activate the prime motor 180 based on factors external to the HVAC system 10, such as weather, climate, or geographical location. The prime motor 180 may be activated based at least in part on an estimation function of HVAC fan runtime. Fan runtime can be estimated using outdoor weather data and can be adjusted in accordance with parameters relevant to the particular air filter and/or HVAC system operating conditions, such as dwelling parameters, HVAC use parameters, user preference parameters, and filter parameters. The weather data can be obtained for a particular region, for example, from an online data service. The weather data can be used to estimate air filter runtime, and the air filter runtime can be used to estimate the replacement status of the air filter. Exemplary methods for estimating filter replacement status as a function of fan runtime are described in International Publication No. WO 2016/089688 (Fox et al.).

The filter frame assembly 100 may further include a sensor 210 communicably coupled to the controller 200 and configured to generate a signal 212 indicative of a parameter of the filter web 62. The controller 200 may be further configured to selectively activate the prime motor 180 based on the signal 212 received from the sensor 210. In some cases, the controller 200 may selectively activate the prime motor 180 based on the signal 212 to dispense of a varying length of the filter web 62. For example, the varying length of the filter web 62 may depend upon a magnitude of the signal 212.

The sensor 210 may be any sensor capable of measuring a parameter of the filter web 62. The parameters of the filter web 62 that may be measured by the sensor 210 include, but are not limited to, pressure, acoustic parameter, air flow, and acceleration.

For example, the sensor 210 may include a pressure sensor configured to measure a pressure differential across the filter web 62 corresponding to the main frame 110, i.e., a filtering portion of the filter web 62. A high pressure differential across the filtering portion of the filter web 62 may be indicative of one or more obstructions in the filtering portion of the filter web 62 due to dust or contaminants. The controller 200 may therefore determine, based on the pressure differential measured by the pressure sensor, if the filtering portion of the filter web 62 has become obstructed beyond a predetermined value, and activate the prime motor 180 to dispense the filter web 62 from the dispensing spindle 160. In another example, the sensor 210 may be an acoustic sensor configured to measure a sound level of a fan or blower that blows air across the filtering portion of the filter web 62. A high sound level of the fan or blower may be indicative of one or more obstructions in the filtering portion of the filter web 62 due to dust or contaminants. The controller 200 may activate the prime motor 180 based on the sound level measured by the sound sensor to dispense the filter web 62 from the dispensing spindle 160. In another example, the sensor 210 may be part of a spectrometer, and the controller 200 may determine obstructions in the filtering portion of the filter web 62 due to dust or contaminants via the sensor 210 of the spectrometer. Sensors and considerations for monitoring the useful life of the filter web 62 may be found, for example, in U.S. Pat. No. 10,363,509 (Arthur et al.).

In some examples, the controller 200 may be further configured to activate the prime motor 180 based on the signal 212 received from the sensor 210 in order to dispense a predetermined incremental length of the filter web 62 from the dispensing spindle 160. For example, the controller 200 may activate the prime motor 180 upon receiving the signal 212 to dispense the predetermined incremental length (e.g., 5 centimeters) of the filter web 62 from the dispensing spindle 160.

The filter frame assembly may be used to circulate the filter web 62 in order to maintain a low pressure drop through the filter web 62 and provide clean air for a long duration (e.g., 1 year or more), as compared to conventional filters that need to be manually replaced at short time intervals (e.g., monthly).

Figure 14:
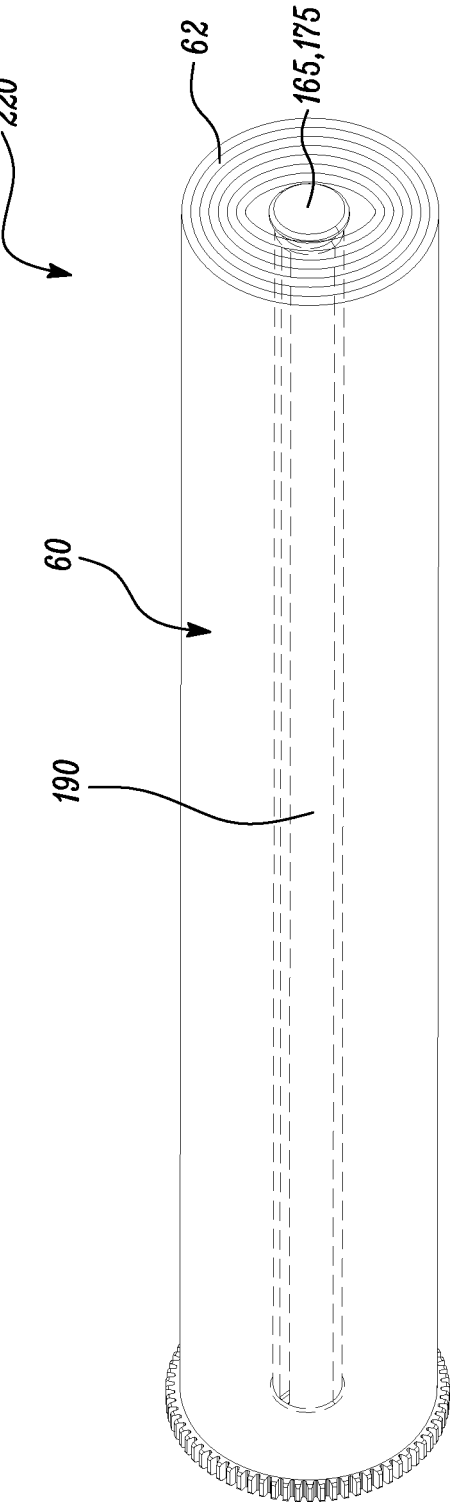
FIG. 14 illustrates a schematic perspective view of a filter roll according to an embodiment of the present disclosure.

FIG. 14 illustrates a schematic perspective view of a filter roll 220 according to an embodiment of the present disclosure. The filter roll 220 may be used with the filtration systems of the present disclosure.

The filter roll 220 may include the spindle 165 of FIGS. 11A and 11B. The filter roll 220 may alternatively include the spindle 175 of FIGS. 12A and 12B. The filter roll 220 may further include the filter media 60 including the filter web 62. The filter web 62 may be at least partially wound on the main tubular portion 190 of the spindle 165 or the spindle 175.

Referring to FIGS. 6 and 14, the filter roll 220 may be used as a replacement roll when the receiving spindle 170 completely receives the filter web 62 thereon from the dispensing spindle 160, i.e., the dispensing spindle 160 is substantially empty and is unable to dispense fresh filter web 62. The filter roll 220 may be placed at a location of the dispensing spindle 160, such that the filter web 62 of the filter roll 220 may be received by the receiving spindle 170.

FIGS. 15A-15I schematically illustrate a method of using the filtration system 50 according to an embodiment of the present disclosure.

Figure 15A:
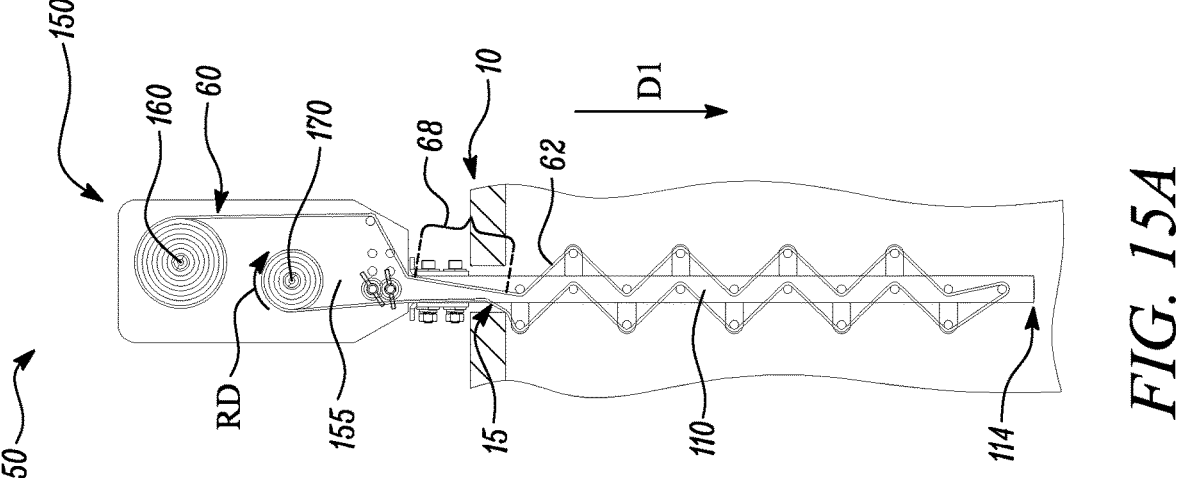

As shown in FIG. 15A, the method may include at least partially inserting the main frame 110 through the filter slot 15 of the HVAC system 10 from the second end 114 (e.g., in the first direction D1), such that the main frame 110 is at least partially received within the HVAC system and the spindle unit 150 is disposed external to the HVAC system 10.

The method may further include periodically rotating the receiving spindle 170 relative to the spindle frame 155 (e.g., in the rotational direction RD) to dispense the predetermined length 68 of the filter web 62 from the dispensing spindle 160.

The method may further include receiving a signal (e.g., the signal 212 of FIG. 13) indicative of a parameter of the filter web 62 and rotating the receiving spindle 170 relative to the spindle frame 155 based on the signal to dispense the predetermined length 68 of the filter web 62 from the dispensing spindle 160.

As shown in FIG. 15B, the method may further include removing the main frame 110 from the HVAC system 10 through the filter slot 15 of the HVAC system 10 (e.g., in the second direction D2).

Referring to FIGS. 15B and 15C, the method may further include removing the receiving spindle 170 from the spindle unit 150, such that the filter web 62 is removed from the dispensing spindle 160.

Figure 15D:
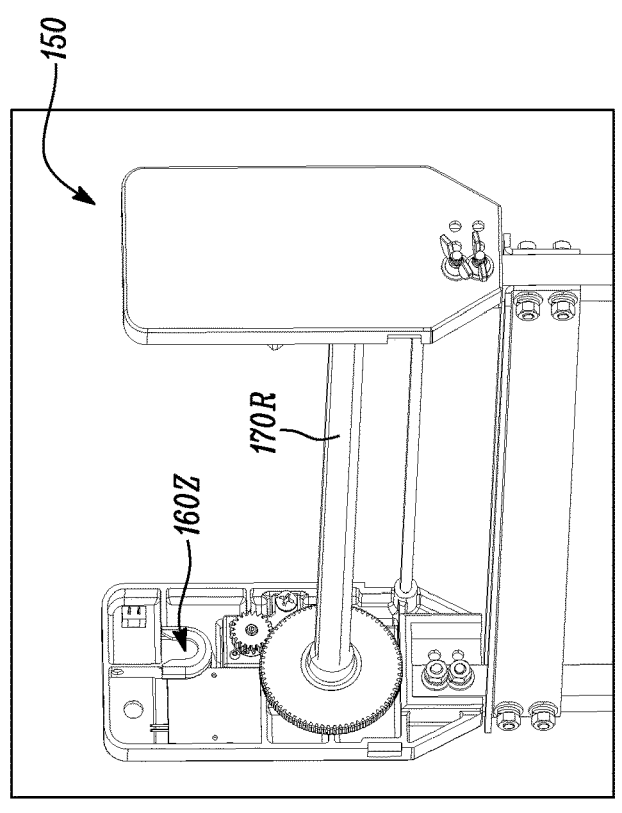
Figure 15C:
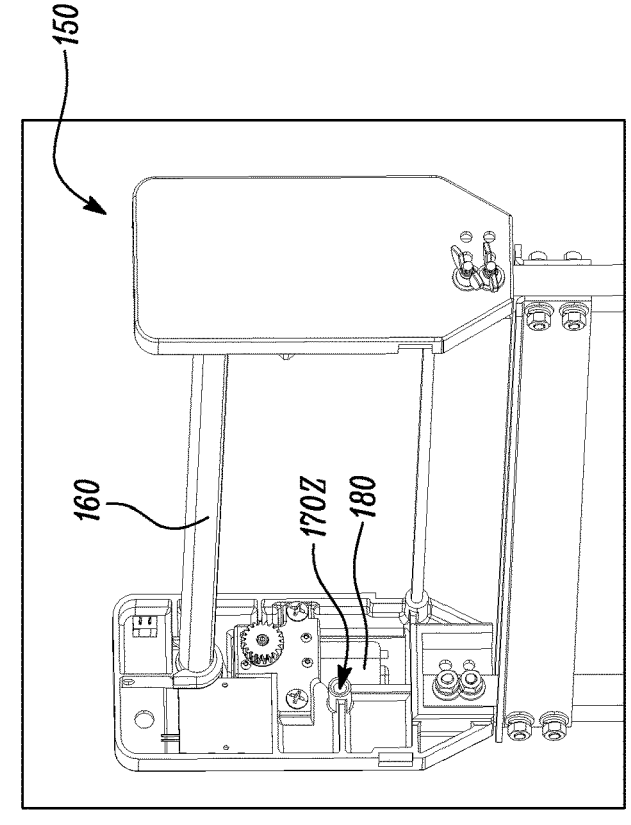

Referring to FIGS. 15C and 15D, the method may further include mounting the dispensing spindle 160 at a receiving spindle location 170Z of the spindle unit 150, such that the dispensing spindle 160 forms a replacement receiving spindle 170R.

Figure 15G:
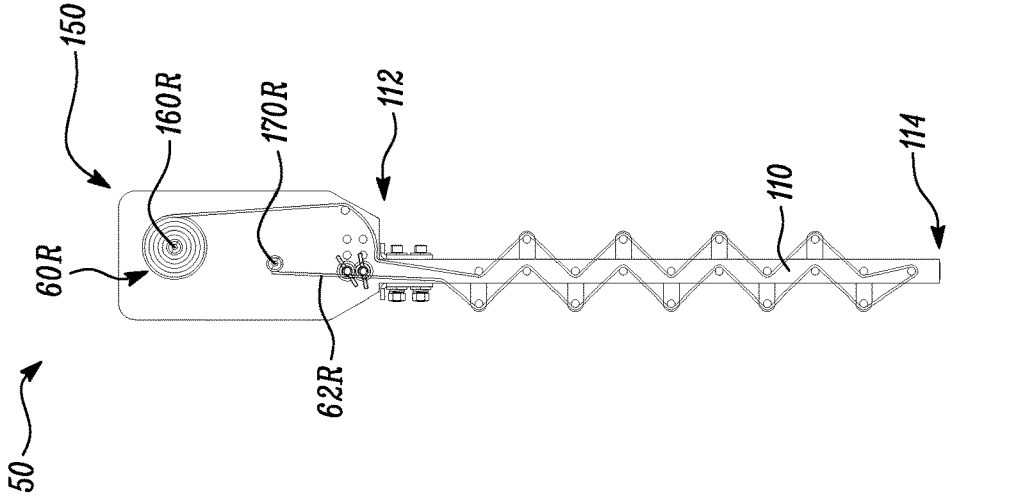
Figure 15F:
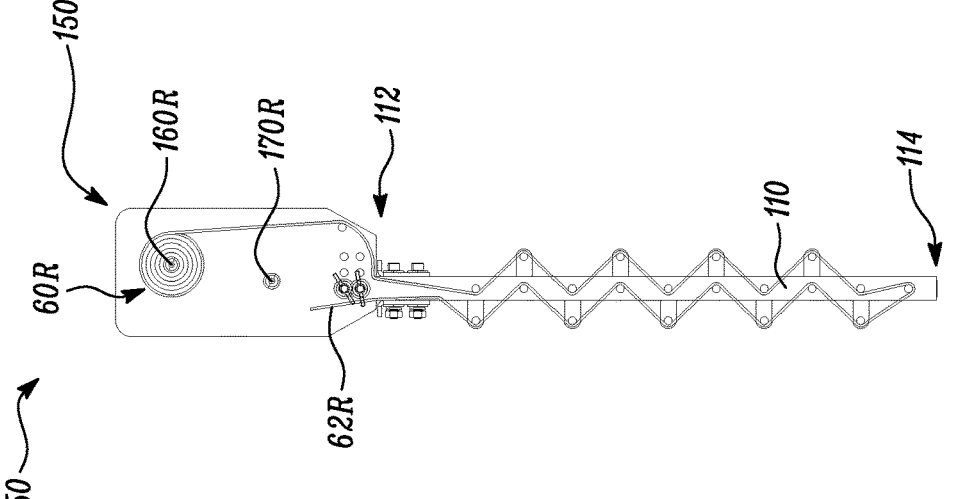
Figure 15E:
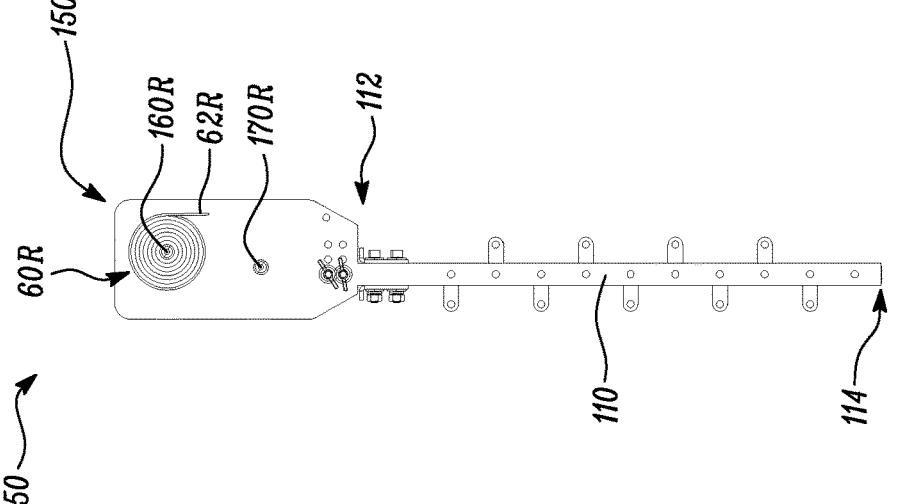

Referring to FIGS. 15D and 15E, the method may further include mounting a replacement dispensing spindle 160R with a replacement filter web 62R of a replacement filter media 60R at a dispensing spindle location 160Z of the spindle unit 150. The replacement dispensing spindle 160R may be similar to the filter roll 220 as described above with reference to FIG. 14. The replacement filter web 62R may be wound on the replacement dispensing spindle 160R.

As shown in FIG. 15F, the method may further include extending the replacement filter web 62R from the replacement dispensing spindle 160R towards the second end 114 of the main frame 110 and extending the replacement filter web 62R back towards the replacement receiving spindle 170R.

As shown in FIG. 15G, the method may further include coupling the replacement filter web 62R to the replacement receiving spindle 170R. The replacement filter web 62R may be coupled to the replacement receiving spindle 170R via tapes, adhesives, and/or via a spindle slot (e.g., the spindle slot 198 of FIGS. 11A and 11B).

Figure 15I:
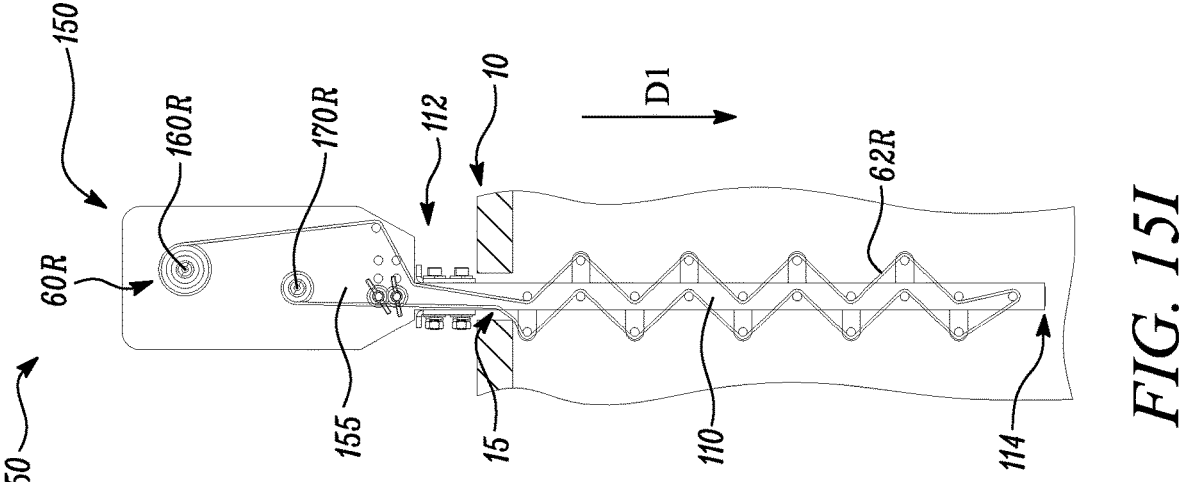
Figure 15H:
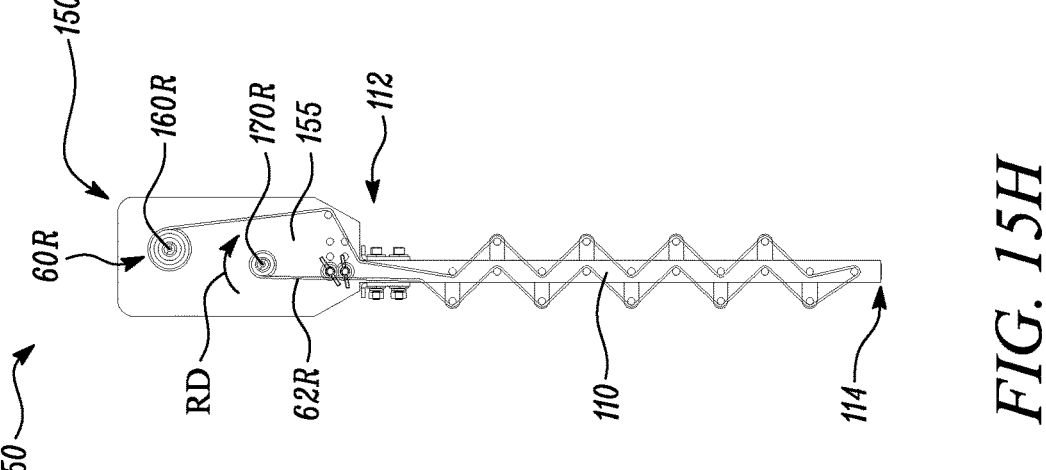

As shown in FIG. 15H, the method may further include rotating the replacement receiving spindle 170R relative to the spindle frame 155 (e.g., in the rotational direction RD), such that the replacement filter web 62R is at least partially wound on the replacement receiving spindle 170R and the replacement filter web 62R is in a tensioned state.

As shown in FIG. 15I, the method may further include at least partially inserting the main frame 110 with a portion of the replacement filter web 62R through the filter slot 15 of the HVAC system 10 from the second end 114 (e.g., along the first direction D1), such that the main frame 110 with the portion of the replacement filter web 62R is at least partially received within the HVAC system 10, and the spindle unit 150 is disposed external to the HVAC system 10.

The replacement filter web 62R can be replaced conveniently when the replacement dispensing spindle 160R is substantially empty by using the method described above with reference to FIGS. 15A-15I.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

The patents, patent documents, and patent applications cited herein are incorporated by reference in their entirety as if each were individually incorporated by reference. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof

What is claimed is:

1. A filter frame assembly for use with filter media comprising a filter web, the filter frame assembly comprising:

a main frame comprising a first end, a second end opposing the first end, and a longitudinal axis extending from the first end to the second end;

a spindle unit disposed at the first end of the main frame, the spindle unit comprising:

a spindle frame coupled to the main frame and extending from the first end of the main frame;

a dispensing spindle non-rotatably coupled to the spindle frame; and a receiving spindle spaced apart from the dispensing spindle and rotatably coupled to the spindle frame; and a plurality of louvers movably coupled to the main frame and spaced apart from each other along the longitudinal axis, wherein each louver from the plurality of louvers is movable relative to the main frame between an expanded position and a contracted position, wherein, in the expanded position, each louver extends outwardly from the main frame and is inclined relative to the longitudinal axis by a first angle, wherein, in the contracted position, each louver is inclined relative to the longitudinal axis by a second angle that is less than the first angle, and wherein each louver is biased towards the expanded position, wherein the main frame is at least partially insertable through a filter slot of a heating, ventilation, and air conditioning (HVAC) system from the second end, such that the main frame is at least partially received within the HVAC system and the spindle unit is disposed external to the HVAC system, wherein each of the dispensing spindle and the receiving spindle is configured to at least partially receive the filter web of the filter media thereon in a wound configuration, such that the filter web extends from the dispensing spindle towards the second end of the main frame and extends back to the receiving spindle, while being at least partially received in the main frame, and wherein the plurality of louvers are configured to at least partially receive the filter web thereon in a zig-zag configuration, wherein, during insertion of the plurality of louvers through the filter slot, the plurality of louvers are configured to sequentially move from the respective expanded positions to the respective contracted positions due to engagement with a wall of the filter slot, and wherein, after insertion of the plurality of louvers through the filter slot, each louver is configured to move back to the expanded position.

2. The filter frame assembly of claim 1, wherein each louver comprises:

a proximal tubular portion and a distal tubular portion spaced apart from the proximal tubular portion, wherein the proximal tubular portion is pivotally coupled to the main frame and the distal tubular portion is decoupled from the main frame, wherein each of the proximal tubular portion and the distal tubular portion is configured to at least partially receive the filter web thereon; and a pair of connecting portions spaced apart from each other and coupled to each of the proximal tubular portion and the distal tubular portion, wherein each of the pair of connecting portions extends between the proximal tubular portion and the distal tubular portion, such that the pair of connecting portions couple the distal tubular portion to the proximal tubular portion, and wherein, in the expanded position, each of the pair of connecting portions extends outwardly from the main frame, such that the distal tubular portion is spaced apart from the main frame.

3. The filter frame assembly of claim 2, wherein, in the respective expanded positions, the pair of connecting portions of each louver extends in a same direction relative to the longitudinal axis, such that the distal tubular portion of each louver is disposed on a same side of the main frame.

4. The filter frame assembly of claim 2, wherein the plurality of louvers comprise a set of first louvers and a set of second louvers, wherein each first louver from the set of first louvers is disposed adjacent to a corresponding second louver from the set of second louvers along the longitudinal axis, wherein, in the respective expanded positions, the pair of connecting portions of each first louver and the pair of connecting portions of each second louver extend in opposite directions relative to the longitudinal axis, such that the distal tubular portion of each first louver and the distal tubular portion of each second louver are disposed on opposing sides of the main frame.

5. The filter frame assembly of claim 4, wherein the proximal tubular portion of each first louver and the distal tubular portion of each second louver are configured to at least partially receive the filter web thereon in a first zig-zag configuration as the filter web extends from the dispensing spindle towards the second end of the main frame, wherein the distal tubular portion of each first louver and the proximal tubular portion of each second louver are configured to at least partially receive the filter web thereon in a second zig-zag configuration as the filter web extends back to the receiving spindle, and wherein the first zig-zag configuration is connected to the second zig-zag configuration proximal to the second end of the main frame.

6. The filter frame assembly of claim 1, further comprising a plurality of mechanical linkages corresponding to the plurality of louvers, wherein each mechanical linkage from the plurality of mechanical linkages is coupled to the main frame and a corresponding louver from the plurality of louvers, and wherein each mechanical linkage biases the corresponding louver towards the expanded position.

7. The filter frame assembly of claim 1, further comprising a plurality of tubular members fixedly coupled to the main frame and spaced apart from each other along the longitudinal axis, wherein the plurality of tubular members are configured to at least partially receive the filter web thereon in a substantially U-shaped configuration or a zig-zag configuration as the filter web extends from the dispensing spindle towards the second end of the main frame and extends back to the receiving spindle.

8. The filter frame assembly of claim 1, wherein each of the dispensing spindle and the receiving spindle comprises:

a main tubular portion comprising a first tubular end and a second tubular end opposite to the first tubular end, wherein the main tubular portion is configured to at least partially receive the filter web thereon in the wound configuration;

a gear portion fixedly coupled to the main tubular portion and disposed at the first tubular end of the main tubular portion, wherein the gear portion comprises a plurality of teeth;

a first coupling portion extending from the gear portion opposite to the main tubular portion and coupled to the spindle frame; and a second coupling portion fixedly coupled to the main tubular portion and disposed at the second tubular end of the main tubular portion, wherein the second coupling portion is coupled to the spindle frame.

9. The filter frame assembly of claim 8, wherein, for at least one of the dispensing spindle and the receiving spindle, the main tubular portion is at least partially hollow, and at least the main tubular portion, the gear portion, and the second coupling portion are separate components, and wherein the at least one of the dispensing spindle and the receiving spindle further comprises:

a first projection extending from the gear portion opposite to the first coupling portion and at least partially received within the main tubular portion, such that the first projection fixedly couples the gear portion and the first coupling portion to the main tubular portion; and a second projection extending from the second coupling portion and at least partially received within the main tubular portion, such that the second projection fixedly couples the second coupling portion to the main tubular portion.

10. The filter frame assembly of claim 1, wherein the spindle frame further comprises a ratchet tab extending towards the dispensing spindle, wherein the dispensing spindle comprises a plurality of teeth, and wherein one or more of the plurality of teeth of the dispensing spindle lockingly engage with the ratchet tab, such that the dispensing spindle is non-rotatably coupled to the spindle frame.

11. The filter frame assembly of claim 1, wherein the receiving spindle comprises a plurality of teeth, wherein the spindle unit further comprises a prime motor and a drive gear drivingly coupled to the prime motor, wherein the drive gear is further meshed with the plurality of teeth of the receiving spindle, and wherein the prime motor is configured to selectively rotate the receiving spindle relative to the spindle frame via the drive gear.

12. The filter frame assembly of claim 11, wherein the spindle unit further comprises a switch configured to selectively activate and deactivate the prime motor based on a user input.

13. The filter frame assembly of claim 11, further comprising a controller communicably coupled to the prime motor, wherein the controller is configured to selectively activate the prime motor in order to rotate the receiving spindle relative to the spindle frame and dispense a portion of the filter web from the dispensing spindle.

14. The filter frame assembly of claim 13, further comprising a sensor communicably coupled to the controller and configured to generate a signal indicative of a parameter of the filter web, and wherein the controller is further configured to selectively activate the prime motor based on the signal received from the sensor.

15. The filter frame assembly of claim 13, wherein the controller is further configured to periodically activate the prime motor on a time-based interval in order to periodically dispense a predetermined length of the filter web from the dispensing spindle.

16. A filtration system for a heating, ventilation, and air conditioning (HVAC) system comprising:

filter media comprising a filter web and the filter frame assembly of claim 1 supporting the filter web.

17. A method of using the filtration system of claim 16, the method comprising at least partially inserting the main frame through the filter slot of the HVAC system from the second end, such that the main frame is at least partially received within the HVAC system and the spindle unit is disposed external to the HVAC system.

18. The method of claim 17, further comprising:

removing the main frame from the HVAC system through the filter slot of the HVAC system;

removing the receiving spindle from the spindle unit, such that the filter web is removed from the dispensing spindle;

mounting the dispensing spindle at a receiving spindle location of the spindle unit, such that the dispensing spindle forms a replacement receiving spindle;

mounting a replacement dispensing spindle with a replacement filter web of a replacement filter media at a dispensing spindle location of the spindle unit, wherein the replacement filter web is wound on the replacement dispensing spindle;

extending the replacement filter web from the replacement dispensing spindle towards the second end of the main frame;

extending the replacement filter web back towards the replacement receiving spindle;

coupling the replacement filter web to the replacement receiving spindle;

rotating the replacement receiving spindle relative to the spindle frame, such that the replacement filter web is at least partially wound on the replacement receiving spindle and the replacement filter web is in a tensioned state; and at least partially inserting the main frame with a portion of the replacement filter web through the filter slot of the HVAC system from the second end, such that the main frame with the portion of the replacement filter web is at least partially received within the HVAC system, and the spindle unit is disposed external to the HVAC system.

* * * * *